United States Patent
Shibuya et al.

(10) Patent No.: US 9,164,267 B2
(45) Date of Patent: Oct. 20, 2015

(54) LENS ARRAY AND MANUFACTURING METHOD THEREOF

(75) Inventors: Kazutaka Shibuya, Kawaguchi (JP); Tadanobu Niimi, Kawaguchi (JP)

(73) Assignee: ENPLAS CORPORATION, Kawaguchi-Shi (JP)

( * ) Notice: Subject to any disclaimer, the term of this patent is extended or adjusted under 35 U.S.C. 154(b) by 130 days.

(21) Appl. No.: 13/990,342

(22) PCT Filed: Dec. 8, 2011

(86) PCT No.: PCT/JP2011/078472
§ 371 (c)(1), (2), (4) Date: May 29, 2013

(87) PCT Pub. No.: WO2012/077762
PCT Pub. Date: Jun. 14, 2012

(65) Prior Publication Data
US 2013/0242401 A1     Sep. 19, 2013

(30) Foreign Application Priority Data

Dec. 9, 2010     (JP) ................................. 2010-274696

(51) Int. Cl.
  *G02B 27/10*     (2006.01)
  *G02B 19/00*     (2006.01)
  *B29C 45/00*     (2006.01)
  (Continued)

(52) U.S. Cl.
  CPC ........ *G02B 19/0028* (2013.01); *B29C 45/0025* (2013.01); *B29D 11/00298* (2013.01); *G02B 3/0025* (2013.01); *G02B 3/0068* (2013.01); *G02B 6/4204* (2013.01); *G02B 6/4214* (2013.01); *G02B 27/108* (2013.01);
  (Continued)

(58) Field of Classification Search
  CPC ........... G02B 19/0028; G02B 27/0172; G02B 3/0056; G02B 27/0101
  USPC .................................. 359/619–630, 455, 559
  See application file for complete search history.

(56) References Cited

U.S. PATENT DOCUMENTS

6,104,536 A * 8/2000 Eckhardt ........................ 359/619
2004/0179784 A1 9/2004 Vancoille et al.
(Continued)

FOREIGN PATENT DOCUMENTS

JP     S58-060421 U     4/1983
JP     58-167126 A     10/1983
(Continued)

OTHER PUBLICATIONS

A Notice of Reasons for Refusal issued by Japanese Patent Office, mailed Sep. 30, 2014, for Japanese counterpart application No. 2010-274696.

*Primary Examiner* — Scott J Sugarman
*Assistant Examiner* — Alberto Betancourt
(74) *Attorney, Agent, or Firm* — Law Office of Katsuhiro Arai

(57) ABSTRACT

As a result of a fourth surface being a surface on a gate side, a merging position of a molten resin material during molding of a lens array main body is placed away from formation positions of lens faces, and as a result of the three dimensional shape of a third recessing section, during molding of the lens array main body, the flow of molten resin material from a surface side that opposes the fourth surface into a flow path corresponding with an area between a first recessing section and a second recessing section can be suppressed.

3 Claims, 23 Drawing Sheets

(51) Int. Cl.
   *B29D 11/00* (2006.01)
   *G02B 3/00* (2006.01)
   *G02B 6/42* (2006.01)

(52) U.S. Cl.
   CPC ....... *B29C2045/0027* (2013.01); *G02B 6/4249* (2013.01); *G02B 27/10* (2013.01)

(56) References Cited

U.S. PATENT DOCUMENTS

| | | |
|---|---|---|
| 2008/0138027 A1 | 6/2008 | Sakurai et al. |
| 2009/0154878 A1 | 6/2009 | Noguchi |
| 2009/0252503 A1 | 10/2009 | Ishigami et al. |
| 2010/0040724 A1 | 2/2010 | Obara et al. |
| 2010/0238520 A1 * | 9/2010 | Nagata .......................... 358/475 |
| 2010/0295063 A1 | 11/2010 | Morioka |

FOREIGN PATENT DOCUMENTS

| | | |
|---|---|---|
| JP | 2000-117785 A | 4/2000 |
| JP | 2003-154550 A | 5/2003 |
| JP | 2006-520491 A | 9/2006 |
| JP | 2008-129274 A | 6/2008 |
| JP | 2009-145656 A | 7/2009 |
| JP | 2009-251375 A | 10/2009 |
| JP | 2010-242124 A1 | 10/2010 |
| JP | 2010262222 A | 11/2010 |
| WO | 2004/083926 A1 | 9/2004 |
| WO | 2008/029870 A1 | 3/2008 |
| WO | 2011/077723 A1 | 6/2011 |
| WO | 2011/125341 A1 | 10/2011 |

* cited by examiner

LENS ARRAY AND MANUFACTURING METHOD THEREOF

This application is the U.S. National Phase under 35 U.S.C. §371 of International Application PCT/JP2011/078472, filed Dec. 8, 2011, which claims priority to Japanese Patent Application No. 2010-274696, filed Dec. 9, 2010. The International Application was published under PCT Article 21(2) in a language other than English.

TECHNICAL FIELD

The present invention relates to a lens array and a method of manufacturing the lens array. In particular, the present invention relates to a lens array suitable for being manufactured by resin molding using a mold and a method of manufacturing the lens array.

BACKGROUND ART

In recent years, in reflection of the need for higher-speed communication and more compact communication devices, there has been an increasing demand for a lens array in which a plurality of lenses are arranged in parallel, as a compactly structured optical component effective for actualizing multi-channel optical communication.

This type of lens array is conventionally configured such that a photovoltaic device including a plurality of light-emitting elements (such as a vertical cavity surface emitting laser [VCSEL]) can be attached thereto and a plurality of optical fibers can be attached thereto.

In a state in which the lens array is disposed between the photovoltaic device and plurality of the optical fibers in this way, the lens array optically couples light emitted from each light-emitting element of the photovoltaic device to an end face of each optical fiber. As a result, multichannel optical communication can be performed.

In addition, among photovoltaic devices, some include a monitoring light-receiving element for monitoring light (particularly intensity or amount of light) emitted from the light-emitting elements to stabilize the output characteristics of the light-emitting elements. A lens array supporting such photovoltaic devices is configured to reflect some of the light emitted from the light-emitting elements towards the monitoring light-receiving element as monitor light.

Furthermore, among the photovoltaic devices, some include a receiving light-receiving element in addition to the light-emitting elements to support bidirectional communication. A lens array supporting such photovoltaic devices include a lens for reception in addition to a lens for transmission.

An example of the lens array supporting light monitoring and an example of the lens array supporting bidirectional communication will hereinafter be described in sequence.

(Light Monitoring-supporting Lens Array)

First, FIG. 20 is a vertical cross-sectional view showing a lens array 1 supporting light monitoring, together with a photovoltaic device 2 and optical fibers 3. In addition, FIG. 21 is a planar view of a lens array main body in the lens array 1 shown in FIG. 20. FIG. 22 is a left-side view of the lens array main body shown in FIG. 20. FIG. 23 is a bottom view of the lens array main body shown in FIG. 20. FIG. 24 is a right-side view of the lens array main body shown in FIG. 20.

As shown in FIG. 20, the lens array 1 is disposed between the photovoltaic device 2 and the optical fibers 3.

Here, the photovoltaic device 2 has a plurality of light-emitting elements 7 on a surface of a semiconductor substrate 5 facing the lens array 1, the light-emitting elements 7 emitting laser light La in a direction perpendicular to the surface (upward direction in FIG. 20). The light-emitting elements 7 configure the above-described VCSEL. In FIG. 20, the light-emitting elements 7 are formed in an array along a direction perpendicular to the surface of the paper on which FIG. 20 is printed. In addition, the photovoltaic device 2 has a plurality of monitoring light-receiving elements 8 on the surface of the semiconductor substrate 5 facing the lens array 1, in positions near the left-hand side in FIG. 20 of the light-emitting elements 7. The light-receiving elements 8 receive monitor light M for monitoring the output (such as intensity or amount of light) of the laser light La emitted from the light-emitting elements 7. The number of light-receiving elements 8 is the same as the number of light-emitting elements 7. The light-receiving elements 8 are formed in an array in the same direction as the light-emitting elements 7. The positions in the array direction match between corresponding elements 7 and 8. In other words, the light-receiving elements 8 are formed at the same pitch as the light-emitting elements 7. The light-receiving elements 8 are configured by photodetectors or the like. Furthermore, a control circuit (not shown) that controls the output of the laser light La emitted from the light-emitting elements 7 based on the intensity and the amount of light of the monitor light M received by the light-receiving elements 8 is connected to the photovoltaic device 2. The photovoltaic device 2 such as this is configured, for example, to be arranged opposing the lens array 1 in a state in which the semiconductor substrate 5 is in contact with the lens array 1. The photovoltaic device 2 together with the lens array 1 configures an optical module by, for example, being attached to the lens array 1 by a known fixing means (not shown) such as a clamp spring.

In addition, the same number of optical fibers 3 as the number of light-emitting elements 7 and the number of light-receiving elements 8 are arranged. The optical fibers 3 are formed in an array at the same pitch as the light-emitting elements 7 along the direction perpendicular to the surface of the paper on which FIG. 20 is printed in FIG. 20. The optical fibers 3 have the same dimensions as one another. A portion of each optical fiber 3 on an end face 3a side is held within a multi-core integrated optical connector 10, such as a mechanically transferable splicing connector (MT connector). The optical fibers 3 such as this are, for example, attached to the lens array 1 by a known fixing means (not shown) (such as a clamp spring) in a state in which an end surface of the optical connector 10 on the lens array 1 side is in contact with the lens array 1.

The lens array 1 optically couples each light-emitting element 7 with the end face 3a of each optical fiber 3 in a state in which the lens array 1 is disposed between the photovoltaic device 2 and the optical fibers 3 such as those described above.

The lens array 1 will be described in further detail. As shown in FIG. 20, the lens array 1 has a light-transmissive lens array main body 4. The outer shape of the lens array main body 4 is formed into a substantially rectangular plate shape. In other words, as shown in FIG. 20 and FIG. 21, the rough outer shape of the lens array main body 4 is configured by each planar surface: an upper end surface 4a, a lower end surface 4b, a left end surface 4c, a right end surface 4d, a front end surface 4e, and a back end surface 4f. The upper and lower end surfaces 4a and 4b are parallel with each other. The left and right end surfaces 4c and 4d are also parallel with each other. Furthermore, the upper and lower end surfaces 4a and 4b and the left and right end surfaces 4c and 4d are perpendicular to each other.

The photovoltaic device 2 is attached to the lower end surface 4b of the lens array main body 4 such as this. As shown in FIG. 20 and FIG. 23, a plurality (12 lens faces) of first lens faces (convex lens faces) 11 having a circular planar shape are formed on the lower end surface 4b. The number of first lens faces 11 is the same as the number of light-emitting elements 7. Here, as shown in FIG. 20, a portion having a substantially rectangular planar shape in a predetermined area on the right side in FIG. 20 of the lower end surface 4b is formed into a recessing plane (referred to, hereinafter, as a lens formation surface 16a) that recesses further upwards than other portions with a counterbore 16 therebetween. The plurality of first lens faces 11 are formed on the lens formation surface 16a on the lower end surface 4b such as this. However, the lens formation surface 16a is formed in parallel with the other portions of the lower end surface 4b. In addition, the first lens faces 11 are formed such as to be arrayed in a predetermined array direction (the direction perpendicular to the surface of the paper on which FIG. 20 is printed in FIG. 20, and a vertical direction in FIG. 23) corresponding with the light-emitting elements 7. Furthermore, the first lens faces 11 are formed having the same dimensions as one another and are formed at the same pitch as the light-emitting elements 7. Still further, the first lens faces 11 that are adjacent to each other in the array direction are formed in an adjoining state in which respective peripheral end sections are in contact with each other. In addition, an optical axis OA(1) of each first lens face 11 is formed perpendicular to the lower end surface 4b of the lens array main body 4. Moreover, the optical axis OA(1) of each first lens face 11 is formed to match a center axis of the laser light La emitted from each light-emitting element 7 corresponding with each first lens face 11.

As shown in FIG. 20, the laser light La emitted from each light-emitting element 7 corresponding with each first lens face 11 enters each first lens face 11. Each first lens face 11 advances the incident laser light La of each light-emitting element 7 into the lens array main body 4. Each first lens face 11 collimates the incident laser light La of each light-emitting element 7 in some instances, and converges the incident laser light La in other instances.

On the other hand, the plurality of optical fibers 3 are attached to the left end surface 4c of the lens array main body 4. As shown in FIG. 20 and FIG. 22, a plurality of second lens faces (convex lens faces) 12 having a circular planar shape are formed on the left end surface 4c. The number of second lens faces 12 is the same as the number of the first lens faces 11. Here, as shown in FIG. 20 and FIG. 22, a portion having a substantially rectangular planar shape in a predetermined area in the center of the left end surface 4c is formed into a recessing plane (referred to, hereinafter, as a lens formation surface 17a) that recesses further to the right in FIG. 20 than other portions on the peripheral side surrounding the portion with a counterbore 17 therebetween. The plurality of second lens faces 12 are formed on the lens formation surface 17a on the left end surface 4c such as this. However, the lens formation surface 17a is formed in parallel with the other portions of the left end surface 4c. In addition, the second lens faces 12 are formed such as to be arrayed in the same direction as the array direction of the end faces 3a of the optical fibers 3, or in other words, the array direction of the first lens faces 11. Furthermore, the second lens faces 12 are formed having the same dimensions as one another and are formed at the same pitch as the first lens faces 11. Still further, the second lens faces 12 that are adjacent to each other in the array direction are formed in an adjoining state in which respective peripheral end sections are in contact with each other. In addition, an optical axis OA(2) of each second lens face 12 is formed perpendicular to the left end surface 4c of the lens array main body 4. Moreover, the optical axis OA(2) of each second lens face 12 is formed to be positioned coaxially with the center axis of the end face 3a of each optical fiber 3 corresponding with each second lens face 12.

The laser light La of each light-emitting element 7 that has entered each first lens face 11 corresponding with each second lens face 12 and advanced on an optical path within the lens array main body 4 enters each second lens face 12, as shown in FIG. 20. Each second lens face 12 converges the incident laser light La of each light-emitting element 7 and emits the converged laser light La to the end face 3a of each optical fiber 3a corresponding with each second lens face 12.

In this way, each light-emitting element 7 and the end face 3a of each optical fiber are optically coupled by the first lens face 11 and the second lens face 12.

Furthermore, as shown in FIG. 20 and FIG. 23, third lens faces (convex lens face) 13 having a circular planar shape are formed on the lens formation surface 16a on the lower end surface 4b of the lens array main body 4, in positions near the left-hand side in FIG. 20 of the first lens faces 11. The number of third lens faces 13 is the same as the number of the light-receiving elements 8 (according to the present embodiment, the number of third lens faces 13 is also the same as the number of light-emitting elements 7, the number of optical fibers 3, the number of first lens faces 11, and the number of second lens faces 12). The third lens faces 13 are formed such as to be arrayed in a predetermined array direction corresponding with the light-receiving elements 8, or in other words, the same direction as the array direction of the first lens faces 11. Furthermore, the third lens faces 13 are formed having the same dimensions as one another and are formed at the same pitch as the light-receiving elements 8. Still further, the third lens faces 13 that are adjacent to each other in the array direction are formed in an adjoining state in which respective peripheral end sections are in contact with each other. In addition, an optical axis OA(3) of each third lens face 13 is formed perpendicular to the lower end surface 4b of the lens array main body 4. Moreover, the optical axis OA(3) of each third lens face 13 is formed to almost match the center axis of a light-receiving surface of each light-receiving element 8 corresponding with each third lens face 13.

The monitor light M of each light-emitting element 7 corresponding with each third lens face 13 enters each third lens face 13 from within the lens array main body 4, as shown in FIG. 20. Each third lens face 13 converges the incident monitor light M of each light-emitting element 7 and emits the converged monitor light M towards each light-receiving element 8 corresponding with each third lens face 13.

Still further, as shown in FIG. 20 and FIG. 21, a first recessing section 18 having a substantially trapezoidal vertical cross-sectional shape is formed in a recessing manner on the upper end surface 4a of the lens array main body 4. A sloped surface 18a forming a portion of the inner surface of the first recessing section 18 serves as a total reflection surface 18a. As shown in FIG. 20, the total reflection surface 18a is formed into a sloped surface having a tilt in relation to both the lower end surface 4b and the left end surface 4c of the lens array main body 4 such that the upper end portion thereof is positioned further to the left side in FIG. 20 (in other words, towards a second recessing section 19, described hereafter) than the lower end portion thereof. In addition, as shown in FIG. 21, the planar shape of the total reflection surface 18a is formed into a substantially rectangular shape that is elongated in the array direction of the first lens faces 11 (a vertical direction in FIG. 21). The total reflection surface 18a is disposed on the optical path of the laser light La of each light-emitting element 7 between the first lens faces 11 and a first optical surface 19a of the second recessing section 19, described hereafter.

As shown in FIG. 20, the laser light La of each light-emitting element 7 that has entered each first lens face 11 enters the total reflection surface 18a such as this at an angle of incidence that is the critical angle or greater, from below in FIG. 20. The total reflection surface 18a totally reflects the incident laser light La of each light-emitting element 7 towards the left side in FIG. 20.

The tilt angle of the total reflection surface 18a is 40° to 50° (such as 45°) in the clockwise direction in FIG. 20, with reference to the lower end surface 4b (0°).

In addition, as shown in FIG. 20 and FIG. 21, the second recessing section 19 is formed in a recessing manner on the upper end surface 4a of the lens array main body 4 such as to be positioned on the optical path of the laser light La passing through the first lens faces 11 and the second lens faces 12. As shown in FIG. 20 and FIG. 21, the second recessing section 19 is formed such that the vertical cross-sectional shape is rectangular, and the planar shape is a rectangular shape that is elongated in the array direction of the first lens faces 11.

Here, as shown in FIG. 20, the first optical surface 19a forming a portion of the inner surface of the second recessing section 19 is formed on the right side surface of the second recessing section 19. The first optical surface 19a is formed in parallel with the left end surface 4c of the lens array main body 4.

As shown in FIG. 20, the laser light La of each light-emitting element 7 that has been totally reflected by the total reflection surface 18a perpendicularly enters the first optical surface 19a such as this. The angle of incidence (in other words, a direction of incidence) is an angle (direction of incidence) that is also perpendicular to the left end surface 4c.

In addition, as shown in FIG. 20, a second optical surface 19b is formed on the left side surface of the second recessing section 19 such as to form a portion of the inner surface of the second recessing section 19 and form a portion opposing the first optical surface 19a on the left side in FIG. 20. The second optical surface 19b is also formed in parallel with the left end surface 4c.

As shown in FIG. 20, the laser light La of each light-emitting element 7 that has entered the first optical surface 19a and subsequently advanced toward the second lens face 12 side perpendicularly enters the second optical surface 19b such as this. The second optical surface 19b then perpendicularly transmits the incident laser light La of each light-emitting element 7.

Furthermore, as shown in FIG. 20, a prism 20 having a trapezoidal vertical cross-sectional shape is disposed in a space formed by the second recessing section 19.

Here, as shown in FIG. 20, the prism 20 has a first prism face 20a forming a portion of the surface of the prism 20 in a position facing the first optical surface 19a on the left side in FIG. 20. The first prism face 20a is formed into a sloped surface having a predetermined tilt angle in relation to the lower end surface 4b and the left end surface 4c of the lens array main body 4 such that the upper end portion thereof is positioned further to the right side in FIG. 20 (in other words, towards the first optical surface 19a side) than the lower end portion thereof. As a result, as shown in FIG. 20, a space having a right-triangular vertical cross-sectional shape is formed between the first prism face 20a and the first optical surface 19a.

In addition, as shown in FIG. 20, the prism 20 has a second prism face 20b that forms a portion of the surface of the prism 20 and forms a portion opposing the first prism face 20a. The second prism face 20b is disposed in parallel with the second optical surface 19b in a position facing the second optical surface 19b on the right side in FIG. 20 with a predetermined amount of space therebetween.

Furthermore, as shown in FIG. 20, the prism 20 is positioned in relation to the second recessing section 19 such that a right end surface in FIG. 20 is in contact with a portion extending upwards from the upper end of the first optical surface 19a on the right side surface of the second recessing section 19, a lower end surface in FIG. 20 is in contact with a bottom surface 19e (see FIG. 21) of the second recessing section 19, and a shoulder section 21 formed in the upper end portion is in contact with the upper end surface 4a of the lens array main body 4.

The prism 20 such as this forms the optical path of the laser light La of each light-emitting element 7 that has entered the first optical surface 19a and subsequently advances towards the second lens face 12 side.

Still further, as shown in FIG. 20, a filler material 22 composed of a light-transmissive adhesive material fills the space between the second recessing section 19 and the prism 20. The prism 20 is stably held within the second recessing section 19 by the adhesive force of the filler material 22. In addition, as shown in FIG. 20, the filler material 22 is also disposed on the shoulder section 21, and is used to bond the shoulder section 21 to the upper end surface 4a of the lens array main body 4. A thermosetting resin or an ultraviolet-curable resin can be used as the filler material 22 such as this.

In addition, the filler material 22 is formed having the same refractive index as the prism 20. For example, in some instances, the prism 20 is composed of Ultimo (registered trademark) manufactured by SUBIC Innovative Plastics Holding B.V. as a polyetherimide and the filler material 22 is composed of LumipluS (registered trademark) manufactured by Mitsubishi Gas Chemical Company, Inc. In this instance, the refractive indexes of the prism 20 and the filler material 22 are both 1.64 in relation to light having a wavelength of 850 nm. In addition, for example, in some instances, the prism 20 is composed of ARTON (registered trademark) manufactured by JSR Corporation as a cyclic olefin resin, and the filler material 22 is composed of A1754B manufactured by TECS Co., Ltd. as an ultraviolet(UV)-curable resin. In this instance, the refractive indexes of the prism 20 and the filler material 22 are both 1.50 in relation to light having a wavelength of 850 nm.

Furthermore, as shown in FIG. 20, a reflective/transmissive layer 24 having a thin thickness is formed within the space formed by the second recessing section 19 and in a position on the upstream side in the advancing direction of the laser light La of each light-emitting element 7 in relation to the prism 20. Here, as shown in FIG. 20, the surface of the reflective/transmissive layer 24 on the first optical surface 19a side faces the first optical surface 19a with the filler material 22 therebetween, and the surface on the first prism face 20a side is in contact with the first prism face 20a. In some instances, the reflective/transmissive layer 24 such as this is formed by the first prism face 20a being coated with a single layer film composed of a single metal, such as Ni, Cr, or Al, or a dielectric multilayer film obtained by a plurality of dielectrics having differing dielectric constants (such as $TiO_2$ and $SiO_2$) being alternately stacked. In this instance, a known coating technique, such as Inconel deposition, is used for coating. When coating such as this is used, the reflective/transmissive layer 24 is formed into a very thin thickness of, for example, 1 μm or less. However, in some instances, the reflective/ transmissive layer 24 is configured by a glass filter. In addition, the reflective/transmissive layer 24 is formed in parallel with the first prism face 20a.

Here, as shown in FIG. 20, the laser light La of each light-emitting element 7 that has perpendicularly entered the first optical surface 19a advances straight towards the second lens face 12 side on the optical path within the filler material 22 filling the space between the first optical surface 19a and the reflective/transmissive layer 24 without refracting. At this time, when the filler material 22 is formed having the same refractive index as the lens array main body 4 as well, Fresnel reflection at the interface between the first optical surface 19a and the filler material 22 is suppressed. In this instance, the lens array main body 4 may be composed of the same material as the prism 20. Furthermore, the laser light La of each light-emitting element 7 that has advanced into the filler material 22 between the first optical surface 19a and the reflective/transmissive layer 24 enters the reflective/transmissive layer 24. Then, the reflective/transmissive layer 24 reflects the incident laser light La of each light-emitting element 7 towards the third lens face 13 side at a predetermined reflection factor and transmits the laser light La towards the prism 20 side at a predetermined transmission factor. At this time, because the reflective/transmissive layer 24 has a thin thickness, the refraction of the laser light La transmitted through the reflective/transmissive layer 24 can be ignored (considered to be directly advancing transmission). As the reflection factor and the transmission factor of the reflective/transmissive layer 24, desired values are set based on the material, thickness, and the like of the reflective/transmissive layer 24, to the extent that an amount of monitor light M sufficient for monitoring the output of the laser light La can be obtained. For example, when the reflective/transmissive layer 24 is formed by the above-described single layer film, the reflection factor of the reflective/transmissive layer 24 can be 20% and the transmission factor can be 60% (absorption factor 20%), although depending on the thickness thereof. In addition, for example, when the reflective/transmissive layer 24 is formed by the above-described dielectric multilayer film, the reflection factor of the reflective/transmissive layer 24 can be 10% and the transmission factor can be 90%, although depending on the thickness and the number of layers thereof.

As shown in FIG. 20, during reflection or transmission such as this, the reflective/transmissive layer 24 reflects some (light amounting to the reflection factor) of the laser light La of each light-emitting element 7 that has entered the reflective/transmissive layer 24 as the monitor light M of each light-emitting element 7 corresponding to each light-emitting element 7, towards the third lens face 13 corresponding with each beam of monitor light M.

Furthermore, the monitor light M of each light-emitting element 7 reflected by the reflective/transmissive layer 24 in this way advances within the lens array main body 4 towards the third lens face 13 side, and is emitted from each third lens face 13 towards each light-receiving element 8 corresponding to each third lens face 13.

On the other hand, the laser light La of each light-emitting element 7 transmitted by the reflective/transmissive layer 24 enters the first prism face 20a immediately after transmittance. The direction of incidence of the laser light La of each light-emitting element 7 in relation to the first prism face 20a can be considered to be the same as the direction of incidence of the laser light La of each light-emitting element 7 in relation to the reflective/transmissive layer 24. This is because the reflective/transmissive layer 24 is very thin and the refraction of the laser light La by the layer 24 can be ignored. The laser light La of each light-emitting element 7 that has entered the first prism face 20a advances towards the second lens face 12 side on the optical path within the prism 20.

At this time, because the prism 20 is formed having the same refractive index as the filler material 22, when the laser light La of each light-emitting element 7 enters the first prism face 20a, refraction does not occur in the laser light La. The laser light La of each light-emitting element 7 that has advanced on the optical path within the prism 20 perpendicularly enters the second prism face 20b and is perpendicularly emitted outside of the prism 20 from the second prism face 20b.

Next, the laser light La of each light-emitting element 7 emitted from the second prism face 20b perpendicularly enters the filler material 22 filling the space between the second prism face 20b and the second optical surface 19b. The perpendicularly incident laser light La of each light-emitting element 7 advances straight towards the second lens face 12 side on the optical path within the filler material 22 without refracting. At this time, because the filler material 22 is formed having the same refractive index as the prism 20, Fresnel reflection at the interface between the second prism face 20b and the filler material 22 is suppressed.

The laser light La of each light-emitting element 7 that has advanced within the filler material 22 between the second prism face 20b and the second optical surface 19b in this way is perpendicularly emitted from the filler material 22 and, immediately thereafter, perpendicularly enters the second optical surface 19b, as described above. The laser light La of each light-emitting element 7 that has perpendicularly entered the second optical surface 19b advances towards the second lens face 12 side on the optical path within the lens array main body 4 after the second optical surface 19b, and is then emitted by each second lens face 12 towards the end face of each optical fiber 3 corresponding with each second lens face 12.

As shown in FIG. 21, the second recessing section 19 is formed such that the bottom surface 19e as well as all side surfaces 19a to d of the second recessing section 19 fit within an area indicated by the outer shape of an opening section 19f of the second recessing section 19 when viewed from a surface-normal direction of the upper end surface 4a (above in FIG. 20). In other words, the second recessing section 19 is formed such that the respective projection surfaces in the surface-normal direction of the upper end surface 4a of the bottom surface 19e and all side surfaces 19a to d fit within the area indicated by the outer shape of the opening section 19f. The shape of the second recessing section 19 such as this is a shape enabling detachability from a mold to be ensured. This similarly applies to the above-described first recessing section 18.

In addition, as shown in FIG. 20 to FIG. 23, a pair of fiber-positioning projecting sections 25 are formed such as to be perpendicular to the left end surface 4c, on the left end surface 4c of the lens array main body 4 in positions on both outer sides of the lens formation surface 17a in the array direction of the second lens faces 12, as an optical-fiber positioning structure on the lens array side. The pair of fiber-positioning projecting sections 25 are formed into circular pin shapes (circular columnar shapes) having the same dimensions that project from the left end surface 4c towards the optical fiber 3 side.

On the other hand, as a configuration on the optical fiber 3 side corresponding with the pair of fiber-positioning projecting sections 25, as shown in FIG. 25, a pair of fiber-positioning recessing sections 26 are formed in the optical connector 10, as an optical-fiber positioning structure on the optical fiber side. However, in FIG. 25, because both fiber-positioning recessing sections 26 overlap in the direction perpendicular to the surface of the paper on which FIG. 25 is printed, only one fiber-positioning recessing section 26 towards the front of the paper surface is visible. The pair of fiber-positioning recessing sections 26 are formed into circular boss-hole shapes having the same dimensions such as to satisfy dimensional accuracy adhering to the standards (IEC61754-5, JISC5981) for F12-type multi-core fiber connectors.

As shown in FIG. 25, when the optical fibers 3 are attached to the lens array 1, the corresponding fiber positioning projecting sections 25 are inserted into the fiber positioning recessing sections 26. As a result, positioning of the optical fibers 3 when attaching the optical fibers 3 to the lens array 1 is performed.

Furthermore, as shown in FIG. 23, a pair of device-positioning recessing sections 28 are formed on the lower end surface 4b of the lens array main body 4 in positions on both outer sides of the lens formation surface 16a in the array direction of the first lens faces 11 and the third lens faces 13, as a photovoltaic-device positioning structure on the lens array side. The pair of device-positioning recessing sections 28 are formed into circular boss-hole shapes having the same dimensions, and the center axes thereof are formed in parallel with the optical axis OA(1) of the first lens faces 11.

On the other hand, as a configuration on the photovoltaic device 2 side corresponding with the pair of device-positioning recessing sections 28, as shown in FIG. 25, a pair of device-positioning projecting sections 29 are formed in the semiconductor substrate 5, as the photovoltaic-device positioning structure on the photovoltaic device side. However, in FIG. 25, because both device-positioning recessing sections 29 overlap in the direction perpendicular to the surface of the paper on which FIG. 25 is printed, only one device-positioning recessing section 29 towards the front of the paper surface is visible. The pair of device-positioning projecting sections 29 are formed into circular pin shapes having the same dimensions that extend in a direction parallel to the center axis of the outgoing light from the light-emitting elements 7.

As shown in FIG. 25, when the photovoltaic device 2 is attached to the lens array 1, each device-positioning projecting section 29 is inserted into the corresponding device-positioning recessing section 28. As a result, positioning of the photovoltaic device 2 when attaching the photovoltaic device 2 to the lens array 1 is performed.

(Bidirectional Communication-Supporting Lens Array)

Next, FIG. 26 is a vertical cross-sectional view of a bidirectional communication-supporting lens array 31, together with the photovoltaic device 2 and the optical fibers 3. In addition, FIG. 27 is a planar view of the lens array 31 shown in FIG. 26. FIG. 28 is a left-side view of the lens array 31 shown in FIG. 26. FIG. 29 is a bottom view of the lens array 31 shown in FIG. 26.

In the bidirectional communication-supporting lens array 31, the configurations and functions of the first lens faces 11, the second lens faces 12, and the first recessing section 18 are similar to those of above-described light monitoring-supporting lens array 1.

On the other hand, instead of each constituent section 20, 22, and 24 that obtains the above-described monitor light M, the bidirectional communication-supporting lens array 31 includes a configuration for supporting reception of optical signals.

In addition, a configuration supporting reception of optical signals is included on the photovoltaic device 2 side and the optical fiber 3 side as well.

In other words, as shown in FIG. 26, reception-dedicated second optical fibers 33 are arranged in parallel near the optical fibers 3 in the optical connector 10 (near the lower side in FIG. 26). The second optical fibers 33 are arrayed along the same direction as the array direction of the optical fibers 3 at the same pitch as the optical fibers 3. The number of second optical fibers 33 is also the same as the number of the optical fibers 3 (12 optical fibers). In addition, the number of second optical fibers 33 is the same as the number of light-receiving elements 8 and the number of third lens faces 13. Laser light $L_R$ is emitted from each end face 33a of the plurality of second optical fibers 33 facing the lens array 31, towards the lens array 31. The laser light $L_R$ is equivalent to optical signals for reception.

In addition, as shown in FIG. 26, fourth lens faces 14 are formed in positions adjacent to the second lens faces 12 in a direction perpendicular to the array direction of the second lens faces 12 (downward direction in FIG. 26) on the left end surface 4c of the lens array main body 4, in positions facing the end faces 33a of the second optical fibers 33, each fourth lens face 14 into which the laser light $L_R$ emitted from each second optical fiber 33 enters. The number of fourth lens faces 14 is the same as the number of second optical fibers 33. These plurality of fourth lens faces 14 are formed having a circular planar shape with the same dimensions as one another, and are formed in an array along the array direction of the second lens faces 12 at the same pitch as the second lens faces 12. In addition, an optical axis OA(4) of each fourth lens faces 14 is formed perpendicular to the left end surface 4c. The fourth lens faces 14 may have the same dimensions as the second lens faces 12.

Furthermore, as shown in FIG. 26, the second recessing section 19 has a second total reflection surface 34 that forms a portion in a predetermined area on the right end portion side on the bottom surface of the second recessing section 19. The second total reflection surface 34 is formed into a sloped surface such that the upper end portion thereof is positioned further to the left side in FIG. 26 than the lower end portion thereof. The second total reflection surface 34 maybe formed in parallel with the total reflection surface 18a of the first recessing section 18. The laser light $L_R$ of each second optical fiber 33 that has entered each fourth lens face 14 enters the second total reflection surface 34 such as this at an angle of incidence that the critical angle or greater from the left side in FIG. 26. The second total reflection surface 34 totally reflects the incident laser light $L_R$ of each second optical fiber 33 towards the third lens face 13 side (downward in FIG. 26).

The laser light $L_R$ of each second optical fiber 33 that has been totally reflected by the second total reflection surface 34 in this way is converged by each third lens face 13 and emitted towards the corresponding light-receiving elements 8. In other words, in the bidirectional communication-supporting lens array 31, the third lens faces 13 are used to collect reception optical signals instead collecting the monitor light M, and the light-receiving elements 8 are used to receive the reception optical signals instead of receiving the monitor light M.

On the other hand, in a manner similar to that in the light monitoring-supporting lens array 1, laser light $L_T$ of each light-emitting element 7 passes through the first lens faces 11, the total reflection surface 18a, the first optical surface 19a, and the second optical surface 19b in sequence, and is then emitted from each second lens face 12 towards the corresponding end face 3a of the optical fiber 3.

In a configuration such as this, the laser light $L_R$ emitted from each second optical fiber 33 can be coupled with each light-receiving element 8 through the fourth lens faces 14, the second total reflection surface 34, and the third lens faces 13. Therefore, bidirectional communication can be effectively supported.

In the bidirectional communication-supporting lens array 31 such as this, for example, when a configuration separate from the lens array main body 4, such as a coating of reflective film (such as Au, Ag, or AL) on the total reflection surfaces 18a and 34, is not provided, the lens array 31 is the lens array main body 4 itself.

As conventional technology related to lens arrays such as this, proposals such as that in Patent Literature 1 has been made in the past Patent Literature 1: Japanese Patent Application No. 2010-242124

DISCLOSURE OF INVENTION

Problem to be Solved by the Invention

From the perspective of mass-productivity and cost reduction, the above-described lens array main body 4 of the light monitoring-supporting lens array 1 and the bidirectional communication-supporting lens array 31 is preferably manufactured by resin molding using a mold.

Therefore, when the lens array main body 4 such as this is manufactured by injection molding of a resin material using a mold, a resin material in a molten state (referred to, hereinafter, as a molten resin material) is injected into a cavity from a gate through a spool and a runner, and fills the cavity.

At this time, the molten resin material that has been injected into the cavity flows within the cavity such as to separate into a plurality of flows in adherence to the shape of the cavity, and ultimately merges (meets) in a position far from the gate.

At the merging position of the molten resin material such as this, an inevitable molding defect in resin molding using a mold, referred to as a weld, occurs.

Here, when a weld such as this occurs on the lens faces 11 to 14, optical performance of the lens arrays 1 and 31 is significantly reduced.

Therefore, when molding the lens array main body 4, mold design is preferably performed such that the gate is positioned on a transfer surface of the front end surface 4e or the back end surface 4f. As a result, the molten resin material injected into the cavity from the gate can be merged in a position on the transfer surface side (the transfer surface of the back end surface 4f or the front end surface 4e) that is not involved in the transfer of the lens faces 11 to 14. Therefore, occurrence of welds on the lens faces 11 to 14 can be effectively suppressed.

On the other hand, the inventors of the present invention have found that, in the process of conducting keen research to further improve the optical performance of the lens arrays 1 and 31, even when the above-described gate position is selected, a weld occur in a position interfering with optical performance as a result of the unique shape of the lens array main body 4 including both recessing sections 18 and 19.

In other words, FIG. 30 and FIG. 31 (cross-sectional view taken along A-A in FIG. 30) show flow analysis results of the molten resin material (polyetherimide) in an instance in which the lens array main body 4 of the light monitoring-supporting lens array 1 is injection-molded using a mold. For flow analysis, resin flow analysis software (3D TIMON) manufactured by Toray Engineering Co., Ltd. (TIMON is a registered trademark of Toray Engineering Co., Ltd.) was used. As shown in FIG. 30, a gate GT of the mold is positioned on the transfer surface of the front end surface 4e of the lens array main body 4.

As shown in FIG. 30 and FIG. 31, it is clear that a weld W is formed in the lens array main body 4 in a position towards the back end surface 4f between the first recessing section 18 and the second recessing section 19. The weld W such as this is formed for the following reason.

In other words, the molten resin material injected into the cavity from the gate GT flows towards the transfer surface side of the back end surface 4f opposing the gate GT. However, regarding a flow path corresponding with the first recessing section 18 and the second recessing section 19, the flow of molten resin material is suppressed in terms of quantity by the three-dimensional shapes of the transfer surfaces of both recessing sections 18 and 19. In addition, at this time, in a flow path corresponding with the area between the first recessing section 18 and the second recessing section 19 as well, the width is narrow and the molten resin material is not easily injected therein. Therefore, the flow speed of the molten resin material flowing towards the transfer surface side of the back end surface 4f decreases. On the other hand, in a flow path corresponding with the area between the first recessing section 18 and the right end surface 4d of the lens array main body 4 and in a flow path corresponding with the area between the second recessing section 19 and the left end surface 4c of the lens array main body 4, the widths are relatively wide. Therefore, the flow speed of the molten resin material flowing towards the transfer surface side of the back end surface 4f increases. As a result, the molten resin material flowing through the flow path corresponding with the area between the first recessing section 18 and the right end surface 4d and the molten resin material flowing through the flow path corresponding with the area between the second recessing section 19 and the left end surface 4c reach the transfer surface of the back end surface 4f before the molten resin material flowing through the flow path corresponding with the area between both recessing sections 18 and 19, and enter the flow path corresponding with the area between the recessing sections 18 and 19 such as to go around from the side of the transfer surface of the back end surface 4f (counter-flow). Then, the molten resin material that has entered collides almost head-on with the molten resin material advancing through the flow path corresponding with the area between the recessing sections 18 and 19 towards the transfer surface side of the back end surface 4f. As a result, the weld W is formed between the recessing sections 18 and 19.

In addition, FIG. 32 and FIG. 33 (cross-sectional view taken along A-A in FIG. 32) show flow analysis results of the molten resin material in an instance in which the lens array main body 4 of the bidirectional communication-supporting lens array 31 is molded using a mold. The conditions for flow analysis are similar to those in the instance in FIG. 30 and FIG. 31.

As shown in FIG. 32 and FIG. 33, in the lens array main body 4 supporting bidirectional communication as well, the weld W is formed in the position towards the back end surface 4f between the recessing sections 18 and 19 for a reason similar to that of the instance in FIG. 30 and FIG. 31.

Furthermore, FIG. 34 and FIG. 35 (cross-sectional view taken along A-A in FIG. 34) show flow analysis results of the molten resin material regarding the lens array main body 4 of the bidirectional communication-supporting lens array 31 in which, unlike the configuration in FIG. 32 and FIG. 33, the first recessing section 18 is formed having a greater length-direction dimension (lateral width) than the second recessing section 19. The conditions for flow analysis are similar to those for the instance in FIG. 30 and FIG. 31.

In FIG. 34 and FIG. 35 as well, the weld W is formed in the position towards the back end surface 4f between the recessing sections 18 and 19.

In this way, it is clear that the weld W is formed between the recessing sections 18 and 19 in the lens array main body 4 of both lens arrays 1 and 31. However, because the weld W is formed near the optical path of the laser light La passing through the first lens faces 11 and the second lens faces 12, a problem occurs in that optical coupling efficiency of the laser light La in relation to the end surfaces 3a of the optical fibers 3 decreases.

Furthermore, in the lens array main body 4 supporting light monitoring, the weld W between the recessing sections 18 and 19 is positioned near the optical path between the first lens faces 11 and the third lens faces 13 as well. Therefore, a problem also occurs in that the optical coupling efficiency of the monitor light M in relation to the light-receiving elements 8 decreases.

The present invention has been achieved in light of the above-described issues. An object of the present invention is to provide a lens array and a method of manufacturing the lens array in which occurrence of a weld is effectively suppressed, not only on lens faces, but also near an optical path between two recessing sections that are positioned near each other and used for optical path formation in a lens array main body.

Means for Solving Problem

To achieve the above-described object, a lens array according to a first aspect of the present invention is a lens array formed by resin molding using a mold, the lens array including: a plurality of first lens faces formed in an array in a predetermined array direction on a first surface of a lens array main body; a plurality of second lens faces formed in an array along the array direction on a second surface of the lens array main body that is adjacent to the first surface in a direction perpendicular to the array direction; at least a single third lens face formed in a position near the second surface in relation to the first lens faces on the first surface; a first recessing section formed in a recessing manner on a third surface of the lens array main body opposing the first surface, and including a total reflection surface for forming a first optical path passing through the first lens faces and the second lens faces; and a second recessing section formed in a recessing manner on the third surface in a position near the second surface side in relation to the first recessing section, such as to be positioned on the first optical path, for forming a second optical path passing through the third lens face. A fourth surface of the lens array main body adjacent to the first surface and the second surface on one side in the array direction is a surface on a gate side of the mold. A third recessing section for suppressing formation of weld near an optical path between the first recessing section and the second recessing section during molding of the lens array main body is formed on the third surface in a recessing manner such as to be connected to an end portion of the first recessing section on the other side in the array direction or an end portion of the second recessing section on the other side in the array direction. In the invention according to the first aspect, as a result of the fourth surface being the surface on the gate side, a merging position of a molten resin material during molding of the lens array main body can be placed away from the formation positions of the lens faces. Furthermore, as a result of the three dimensional shape of the third recessing section, during molding of the lens array main body, the flow of molten resin material from the surface side opposing the fourth surface into a flow path corresponding with an area between the first recessing section and the second recessing section can be suppressed. Therefore, occurrence of a weld on lens faces and near the optical path between the first recessing section and the second recessing section can be effectively suppressed.

A lens array according to a second aspect is the lens array according to the first aspect in which, further, the third recessing section is formed to be connected to the end portion of the first recessing section on the other side, and the end portion of the first recessing section on the other side is positioned further to the other side in the array direction than the end portion of the second recessing section on the other side. In the invention according to the second aspect, when the third recessing section that is connected to the first recessing section is formed, the shape of the third recessing section does not have to become complex to prevent the third recessing section from connecting with the second recessing section.

In addition, a lens array according to a third aspect is the lens array according to the first aspect in which, further, the third recessing section is formed to be connected to the end portion of the second recessing section on the other side, and the end portion of the second recessing section on the other side is positioned further to the other side in the array direction than the end portion of the first recessing section on the other side. In the invention according to the third aspect, when the third recessing section that is connected to the second recessing section is formed, the shape of the third recessing section does not have to become complex to prevent the third recessing section from connecting with the first recessing section.

In addition, a lens array according to a fourth aspect is the lens array according to any one of the first to third aspects in which, further, light that has entered each of the plurality of first lens faces from outside of the lens array main body enters the second recessing section after being totally reflected by the total reflection surface. A light control member is disposed within a space formed by the second recessing section, the light control member controlling the light that has entered the second recessing section to reflect the light at a predetermined reflection factor and advance the light towards the third lens face side, and transmit the light at a predetermined transmission factor and advance the light towards the second lens face side, and at this time, reflecting either of the light as monitor light for monitoring the light. The second optical path is an optical path passing through the third lens face and the first lens faces. In the invention according to the fourth aspect, in a lens array that supports light monitoring, the occurrence of a weld on the lens faces, near the first optical path between the first recessing section and the second recessing section, and near the second optical path between the first recessing section and the second recessing section can be effectively suppressed.

In addition, a lens array according to a fifth aspect is the lens array according to the fourth aspect in which, further, the optical control member includes: a prism that is disposed within the space formed by the second recessing section and forms an optical path for the light that is advanced towards the second lens face side after entering the second recessing section; and a reflective/transmissive layer that is disposed in a position within the space formed by the second recessing section on an upstream side in an advancing direction of the light in relation to the prism, and reflects the light that has entered the second recessing section at the predetermined reflection factor towards the third lens face side and transmits the light that has entered the second recessing section at the predetermined transmission factor towards the prism side, and at this time, reflects at least either light as the monitor light. In the invention according to the fifth aspect, a monitor light can be obtained with certainty by a simple configuration.

In addition, a lens array according to a sixth aspect is the lens array according to anyone of the first to third aspects in which, further, a plurality of third lens faces are formed such as to be arrayed along the array direction. A plurality of fourth lens faces are formed on the second surface such as to be arrayed along the array direction. The second recessing section includes a second total reflection surface for forming an optical path passing through the third lens faces and the fourth lens faces as the second optical path. In the invention according to the seventh aspect, in a lens array that supports bidirectional communication, the occurrence of a weld on the lens faces and near the first optical path between the first recessing section and the second recessing section can be effectively suppressed.

In addition, in a method of manufacturing a lens array according to a seventh aspect, to manufacture a lens array according to any one of the first to sixth aspects, a three dimensional shape of the third recessing section is determined by flow analysis of a resin material, and a lens array is manufactured that includes the third recessing section having the determined three dimensional shape. In the invention according to the seventh aspect, the third recessing section can be formed that has the optical three dimensional shape for controlling a formation position of a weld to a position away from the vicinity of the optical path between the first recessing section and the second recessing section.

Effect of the Invention

In the present invention, occurrence of a weld can be suppressed, not only on lens faces, but also near an optical path between two recessing sections that are positioned near each other and used for optical path formation in a lens array main body.

Figure 1:
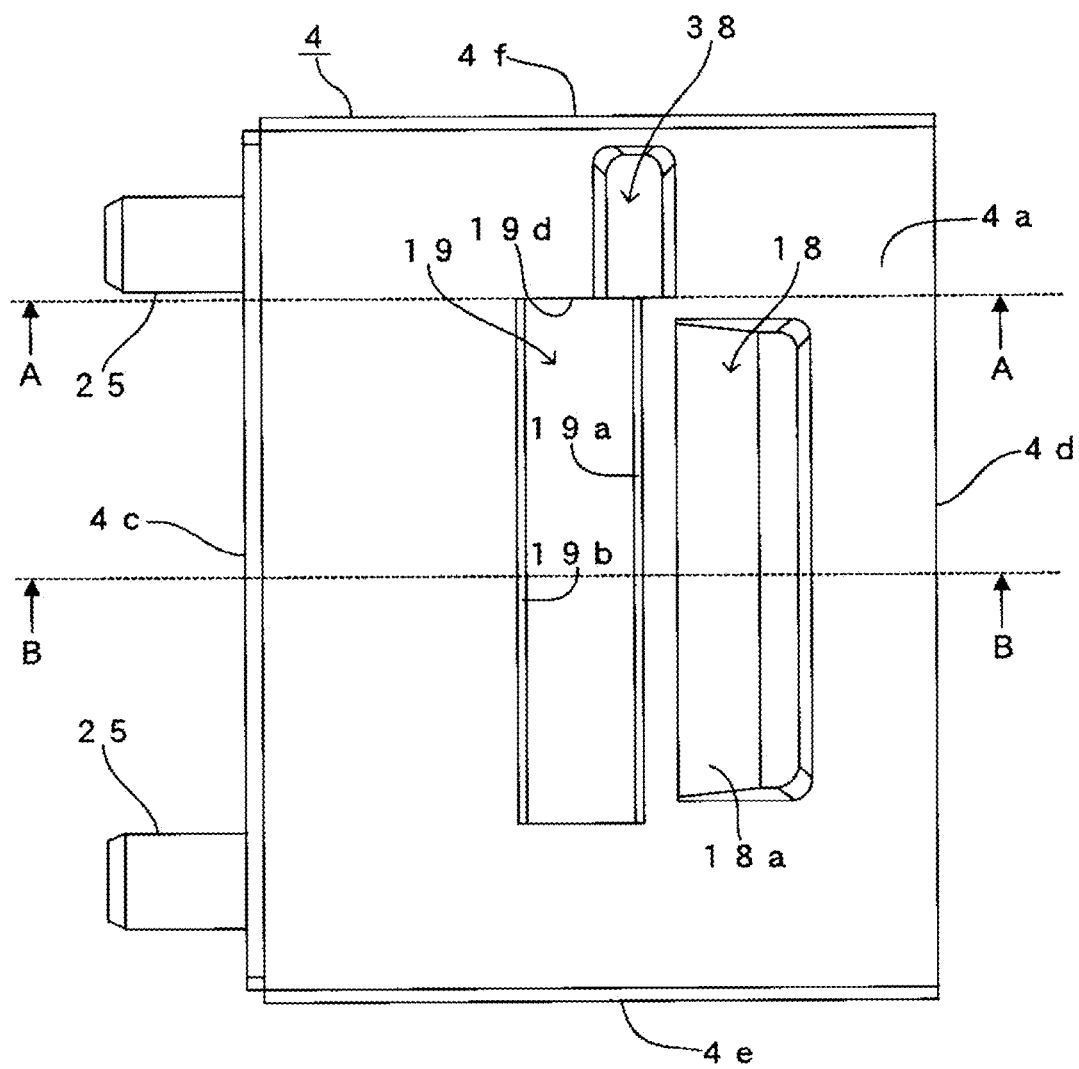
FIG. 1 is a planar view of a lens array main body in a lens array according to a first embodiment of the present invention.

EXPLANATIONS OF LETTERS OR NUMERALS 4 lens array main body
4a upper end surface
4b lower end surface
4c left end surface
11 first lens face
12 second lens face
13 third lens face
18 first recessing section
18a total reflection surface
19 second recessing section
38 third recessing section

Best Mode(S) for Carrying out the Invention (First Embodiment)

A lens array and a method of manufacturing the lens array according to a first embodiment of the present invention will hereinafter be described with reference to FIG. 1 to FIG. 9.

The basic configuration of the lens array according to the present embodiment is similar to that of the lens array 1 supporting light monitoring, shown in FIG. 20 to FIG. 25. Therefore, configurations other than those unique to the present embodiment will be described using the same reference numbers as those of the lens array 1.

Figure 2:
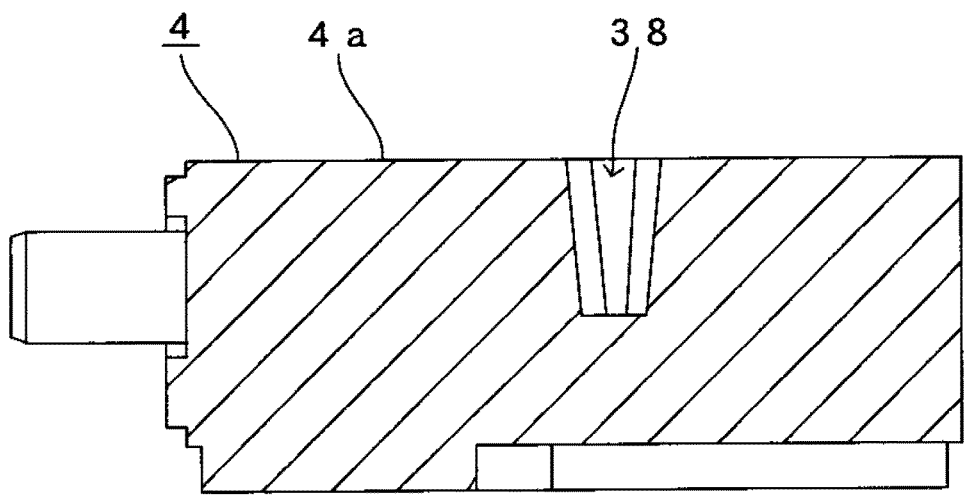
FIG. 2 is a cross-sectional view taken along A-A in FIG. 1.
Figure 3:
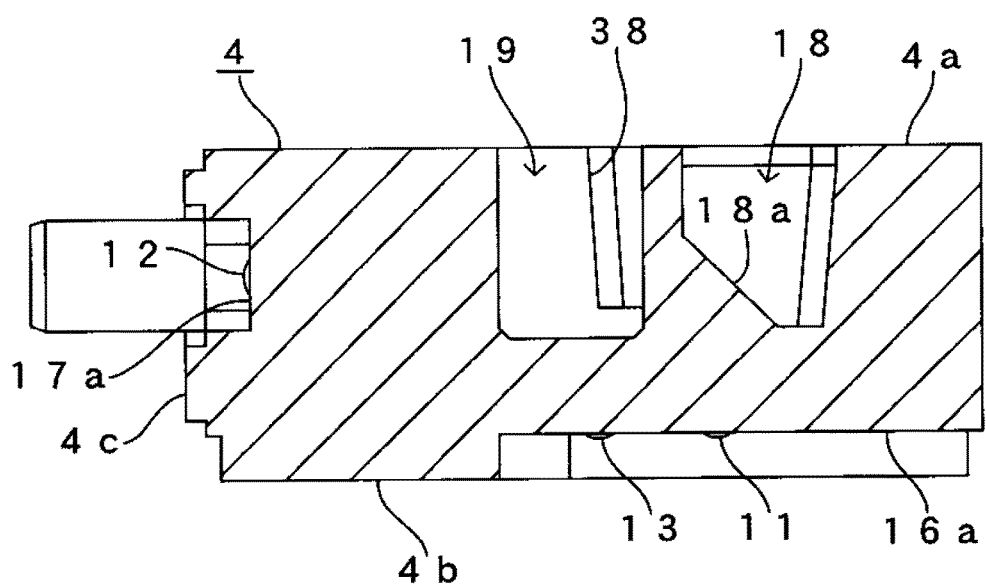
FIG. 3 is a cross-sectional view taken along B-B in FIG. 1.

FIG. 1 is a planar view of the lens array main body 4 of the lens array according to the present embodiment. FIG. 2 is a cross-sectional view taken along A-A in FIG. 1. FIG. 3 is a cross-sectional view taken along B-B in FIG. 1. FIG. 3 corresponds with the vertical cross-sectional view shown in FIG. 20. The left-side view of the lens array main body 4 is similar to that in FIG. 22. The bottom view is similar to that in FIG. 23. Furthermore, the right-side view is similar to that in FIG. 24.

The lens array according to the present embodiment is the lens array supporting light monitoring formed by injection molding using a mold, similar to the lens array 1 shown in FIG. 20 to FIG. 25. The lens array has a similar configuration as the lens array 1.

Figure 20:
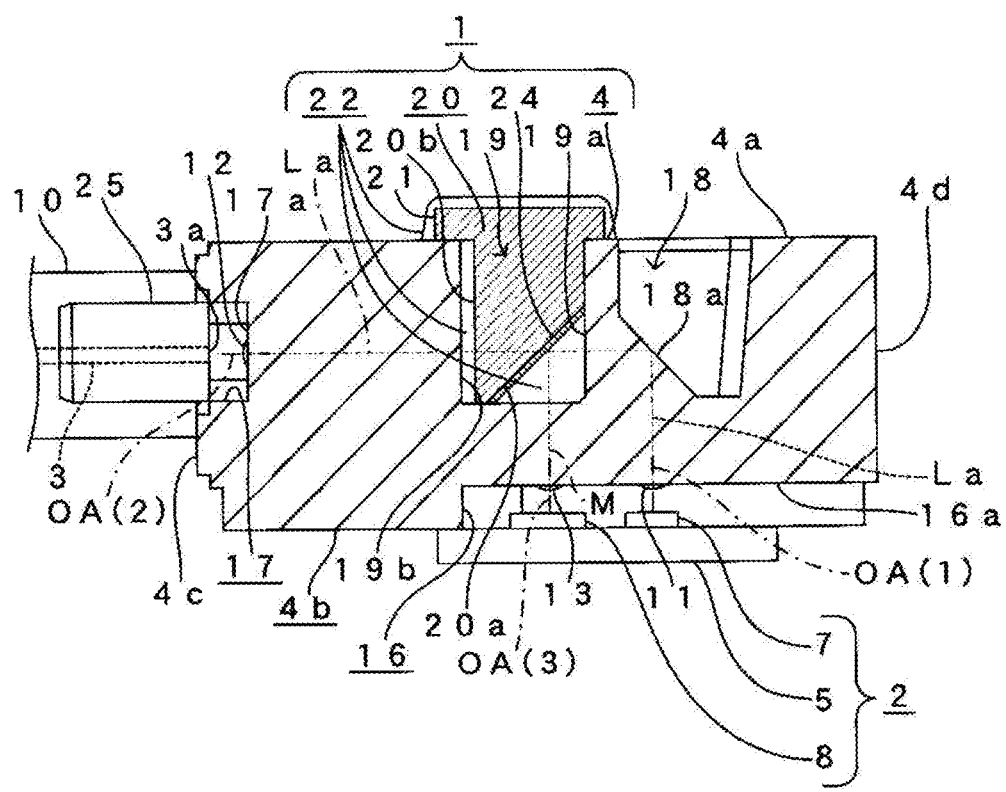
FIG. 20 is a vertical cross-sectional view showing a lens array that supports light monitoring, together with a photovoltaic device and optical fibers.
Figure 21:
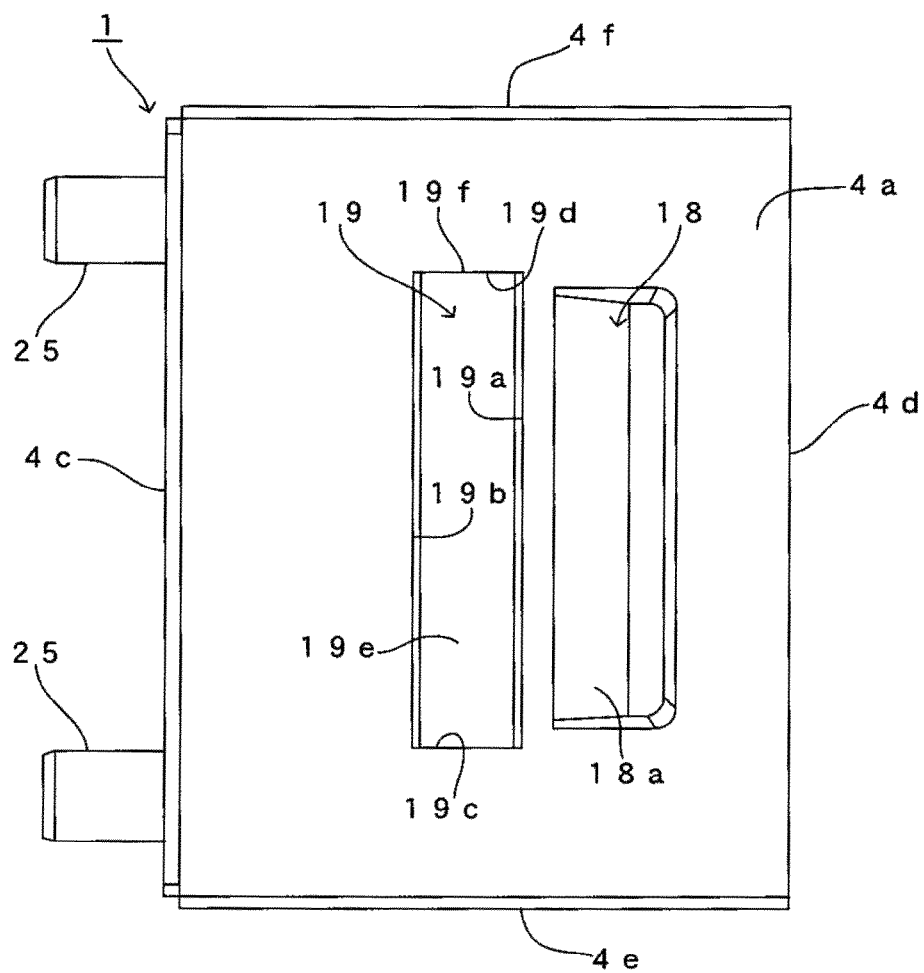
FIG. 21 is a planar view of a lens array main body shown in FIG. 20.
Figure 22:
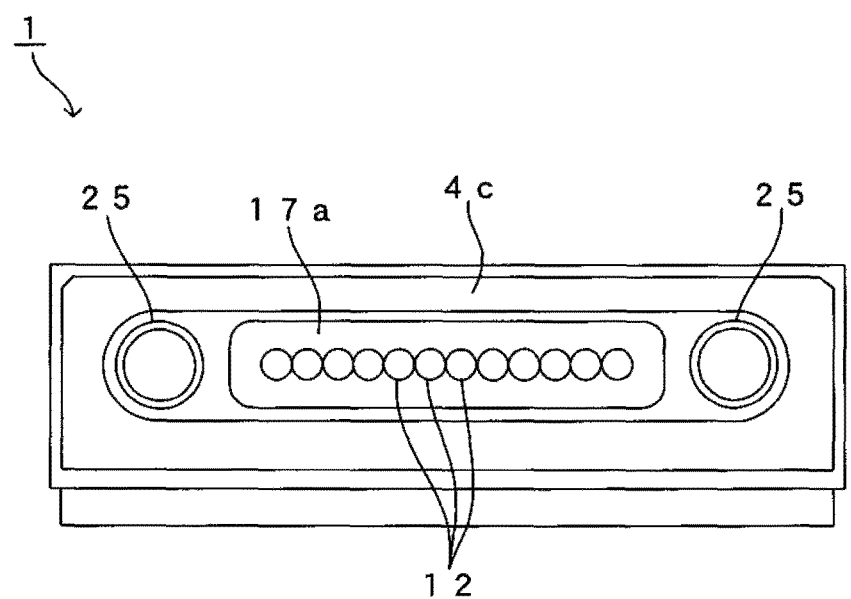
FIG. 22 is a left-side view of the lens array main body shown in FIG. 20.
Figure 23:
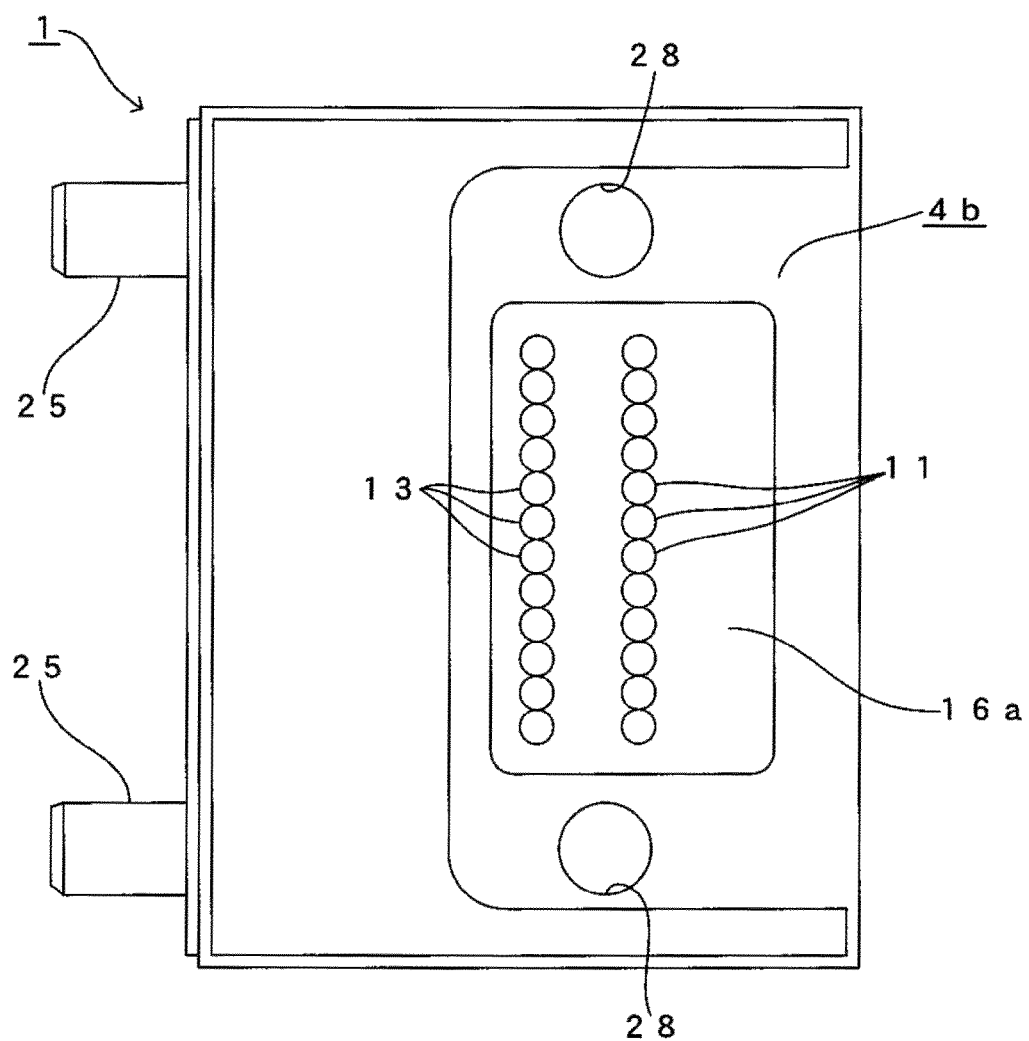
FIG. 23 is a bottom view of the lens array main body shown in FIG. 20.
Figure 24:
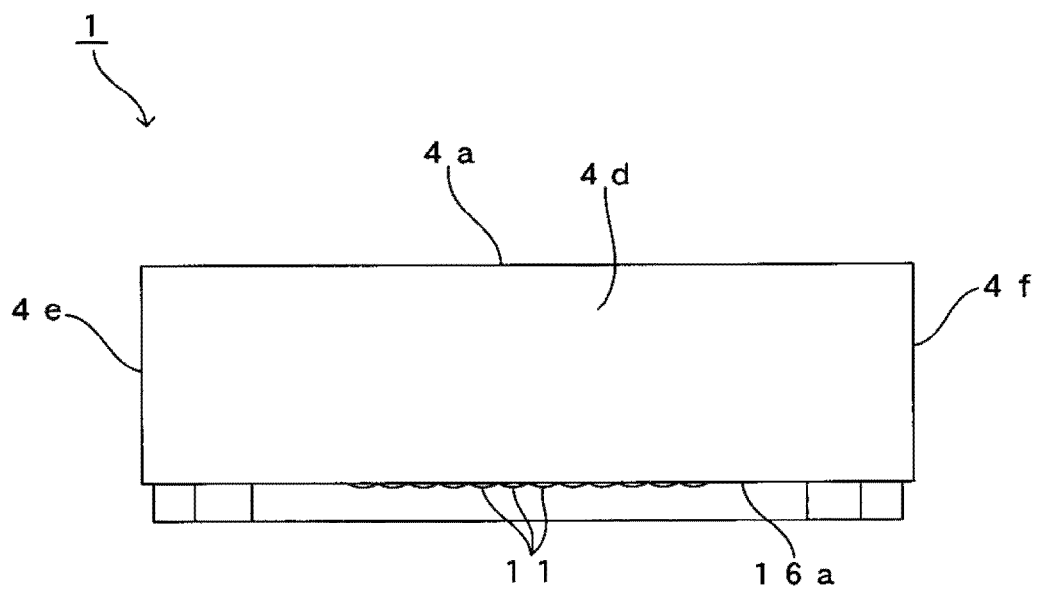
FIG. 24 is a right-side view of the lens array main body shown in FIG. 20.
Figure 25:
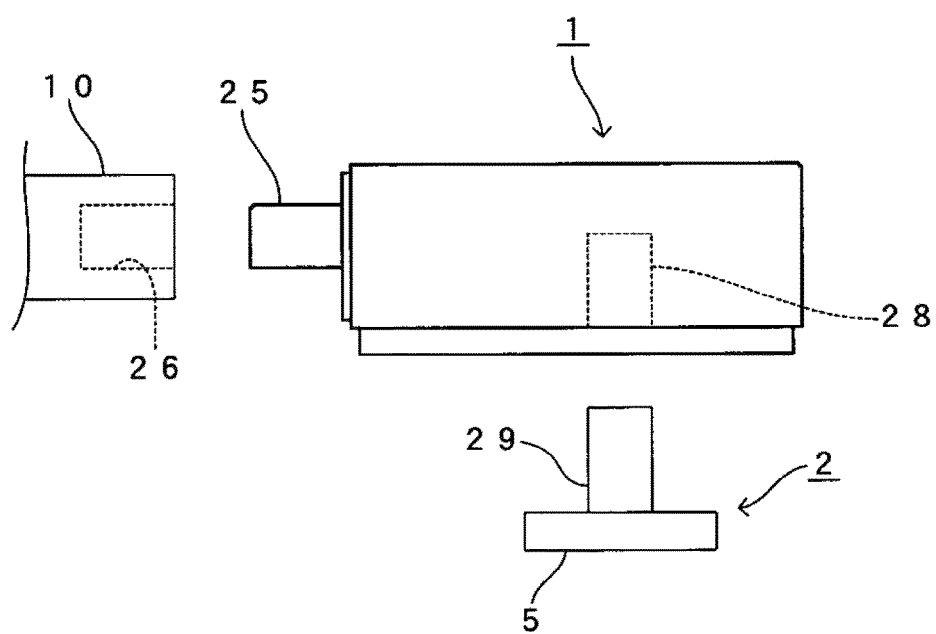
FIG. 25 is an overall configuration diagram of positioning structures for the photovoltaic device and the optical fibers to the lens array shown in FIG. 20.
Figure 26:
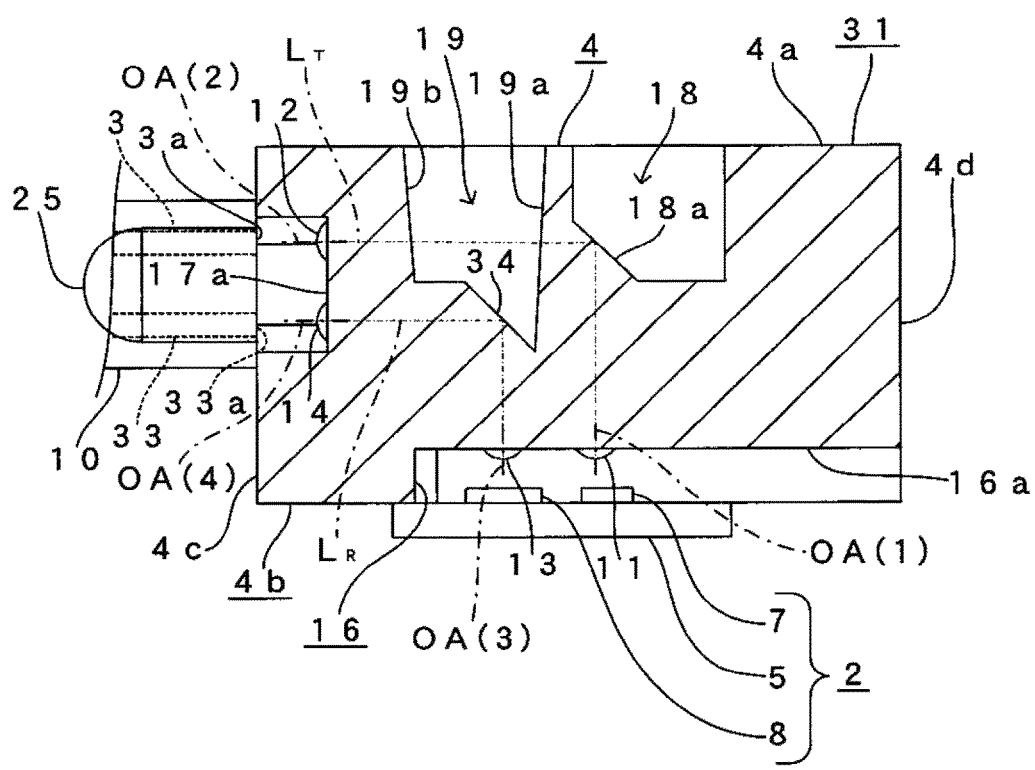
FIG. 26 is a vertical cross-sectional view of a lens array that supports bidirectional communication, together with a photovoltaic device and optical fibers.
Figure 27:
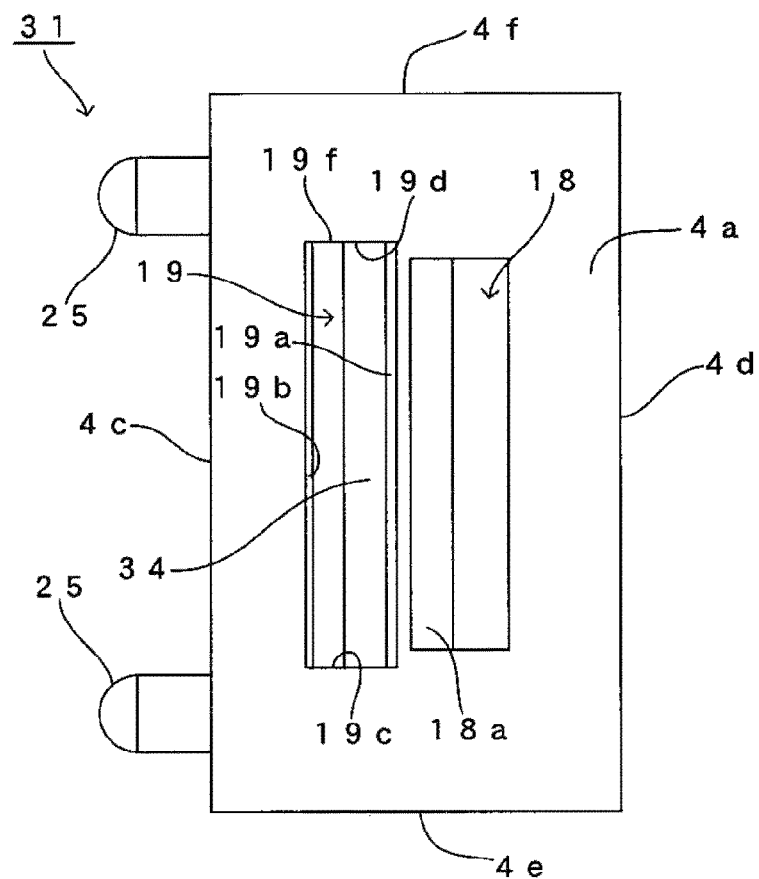
FIG. 27 is a planar view of the lens array shown in FIG. 26.
Figure 28:
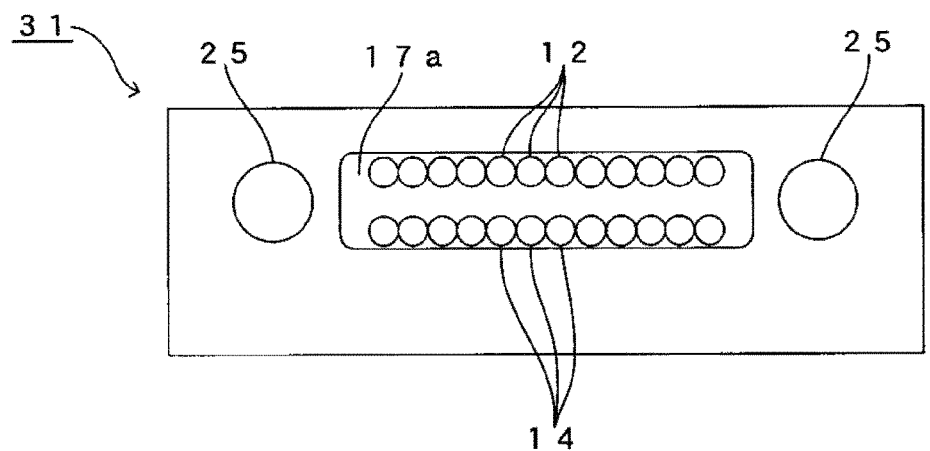
FIG. 28 is a left-side view of the lens array shown in FIG. 26.
Figure 29:
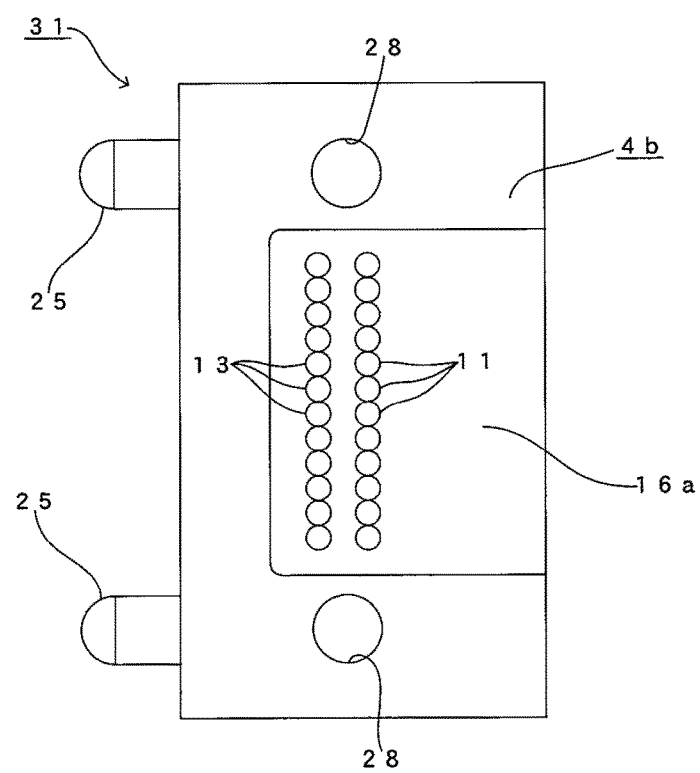
FIG. 29 is a bottom view of the lens array shown in FIG. 26.

In other words, the plurality of first lens faces 11 are formed on the lower end surface 4b serving as a first surface of the lens array main body 4, such as to be arrayed in a direction perpendicular to the surface of the paper on which FIG. 3 is printed in FIG. 3 as the predetermined array direction. In addition, the plurality of second lens faces 12 are formed on the left end surface 4c serving as a second surface of the lens array main body 4 that is adjacent to the lower end face 4b in the direction (left side in FIG. 3) perpendicular to the array direction of the first lens faces 11 and the optical axis direction, such as to be arrayed along the array direction of the first lens faces 11. Furthermore, the plurality of third lens faces 13 are formed on the lower end surface 4b in positions near the left end surface 4c in relation to the first lens faces 11, such as to be arrayed along the array direction of the first lens faces 11. As long as at least a single third lens face 13 is formed, the same number of third lens faces 13 as the number of first lens faces 11 and the number of second lens faces 12 is not necessarily required to be formed. Fewer third lens faces 13 may be formed than the first lens faces 11 and the second lens faces 12. Moreover, the first recessing section 18 is formed in a recessing manner on the upper end surface 4a that opposes the lower end surface 4b and serves as a third surface of the lens array main body 4. The first recessing section 18 has the total reflection surface 18 for forming a first optical path (in other words, the optical path for the laser light La of each light-emitting element 7 described above) passing through the first lens faces 11 and the second lens faces 12. In addition, the second recessing section 19 is formed in a recessing manner on the upper end surface 4a in a position near the left end surface 4c side in relation to the first recessing section 18, such as to be positioned on the first optical path. As shown in FIG. 20, the second recessing section 19 forms an optical path (in other words, an optical path for light monitoring) passing through the third lens faces 13 and the first lens faces 11 as a second optical path, in a state in which light control members composed of the prism 20, the filler material 22, and the reflective/transmissive layer 24 are disposed within the space formed by the second recessing section 19. In a manner similar to that in FIG. 20, the lens array according to the present embodiment is configured by the lens array main body 4 and the light control members 20, 22, and 24. However, the configuration of the light control members is not necessarily limited to that shown in FIG. 20, and various variations disclosed in Non-patent Literature 1 can be applied.

Figure 8:
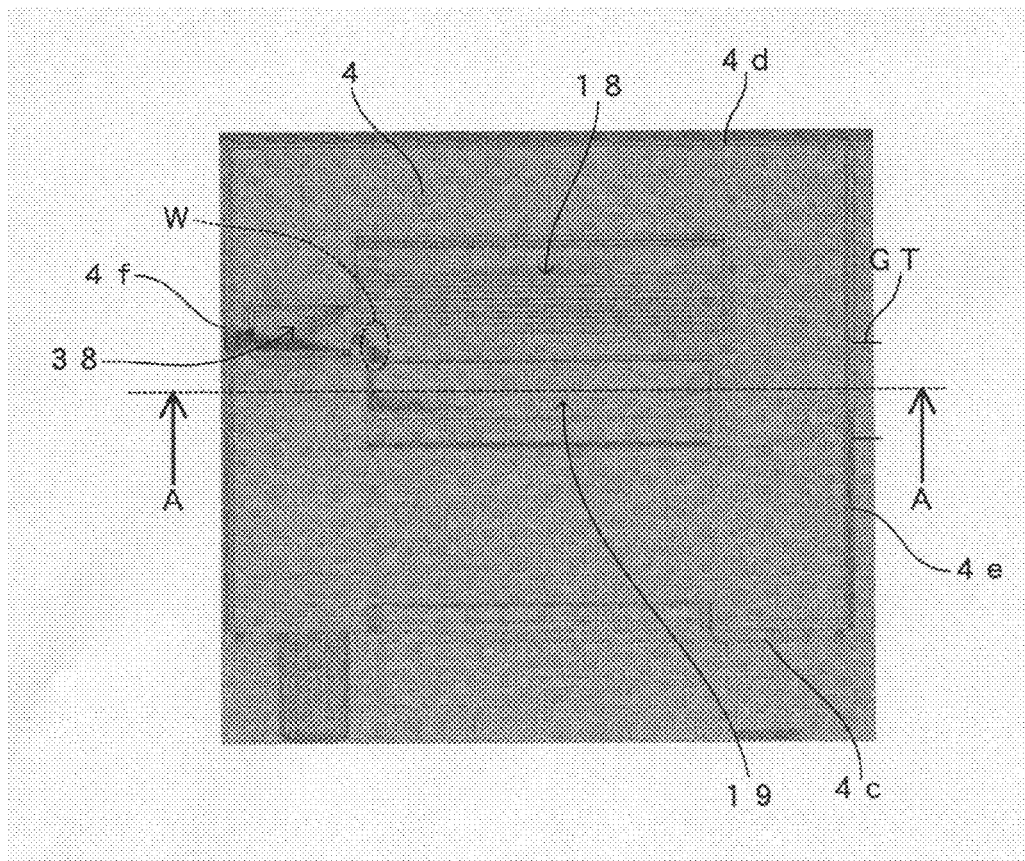
FIG. 8 is a planar view of flow analysis results of a molten resin material in an instance in which the lens array main body is molded using a mold, as an example according to the first embodiment.

In addition to the configuration such as this, further, according to the present embodiment, the first end surface 4e that is adjacent to the lower end surface 4b and the left end surface 4c towards the front (below in FIG. 1) in the array direction of the first lens faces 11 and serves as a fourth surface of the lens array main body 4 is a surface on the gate GT side in the mold (see FIG. 8). In other words, the lens array main body 4 is obtained by resin molding using a mold in which the gate GT is placed on a transfer surface of the front end surface 4e in the cavity.

Furthermore, as shown in FIG. 1 to FIG. 3, according to the present embodiment, a third recessing section 38 is formed in a recessing manner on the upper end surface 4a of the lens array main body 4 to suppress the formation of a weld near the optical path between the recessing sections 18 and 19 during molding of the lens array main body 4.

As shown in FIG. 1, the planar shape of the third recessing section 38 is formed into a substantially rectangular shape that that is elongated in the array direction (vertical direction in FIG. 1) of the first lens faces 11 and is smaller than the first recessing section 18 and the second recessing section 19. In addition, as shown in FIG. 2, the vertical cross-sectional shape is formed into a substantially isosceles-trapezoidal shape in which the bottom is shorter than the top.

In addition, the third recessing section 38 is formed such as to be connected to a back end portion (an end portion on the other side in the array direction) (upper end portion in FIG. 1) of the second recessing section 19. Specifically, a left half portion in FIG. 1 of the front end portion (lower end portion in FIG. 1) of the third recessing section 38 is connected as one to a portion of the second recessing section 19 on the left end portion side in the back end portion. However, as shown in FIG. 3, the depth of the third recessing section 38 is formed to be shallower than the depth of the second recessing section 19. In addition, the front end portion of the third recessing section 38 is positioned collinearly with the back end portion of the second recessing section 19. Furthermore, the back end portion of the third recessing section 38 is positioned near the back end surface 4f of the lens array main body 4.

In the configuration such as this, as a result of the front end surface 4e being the surface on the gate GT side, the merging position of the molten resin material during molding of the lens array main body 4 can be placed away from the formation positions of the lens faces 11 to 13. Furthermore, as a result of the three dimensional shape of the third recessing section 38, during molding of the lens array main body 4, the flow of molten resin material from the back end surface 4f side into the flow path corresponding with the area between the recessing sections 18 and 19 can be suppressed. As a result, during molding of the light monitoring-supporting lens array main body 4, occurrence of welds on the lens faces 11 to 13, near the first optical path between the recessing sections 18 and 19, and near the second optical path between the recessing sections 18 and 19 can be effectively suppressed.

In addition to the above-described configuration, further, according to the present embodiment, as shown in FIG. 1, the back end portion of the second recessing section 19 is positioned further to the back than the back end portion of the first recessing section 18 (above in FIG. 1). As a result, when the third recessing section 38 is formed in a recessing manner such as to connect to only the second recessing section 19, the shape of the third recessing section 38 does not have to become complex to prevent the third recessing section 38 from connecting with the first recessing section 18. Specifically, for example, if the back end portion of the second recessing section 19 is positioned collinearly with the back end portion of the first recessing section 18, the shape of the front end portion of the third recessing section 38 near the back end portion of the first recessing section 18 is required to be bent to prevent contact with the first recessing section 18. However, according to the present embodiment, such complex designs are not required.

Here, in addition to suppressing the occurrence of welds near the first optical path and near the second optical path as described above, a reason for forming the third recessing section 38 such as to be connected to only the second recessing section 19 is as follows.

In other words, when the third recessing section 38 is connected to both the first recessing section 18 and the second recessing section 19, the molten resin material advancing towards the back end surface 4f side through the flow path corresponding with the area between the recessing sections 18 and 19 becomes blocked by the end of the flow path. As a result, problems such as insufficient filling may occur. Therefore, a predetermined amount of space ensuring the flow of molten resin material is required to be provided between the third recessing section 38 and the first recessing section 18 such that the molten resin material that has left the flow path corresponding with the area between the recessing sections 18 and 19 can smoothly flow towards the back end surface 4f. From the reason such as this, according to the present embodiment, the third recessing section 38 is formed so as not to be connected to the first recessing section 18.

(Variation Example)

Figure 4:
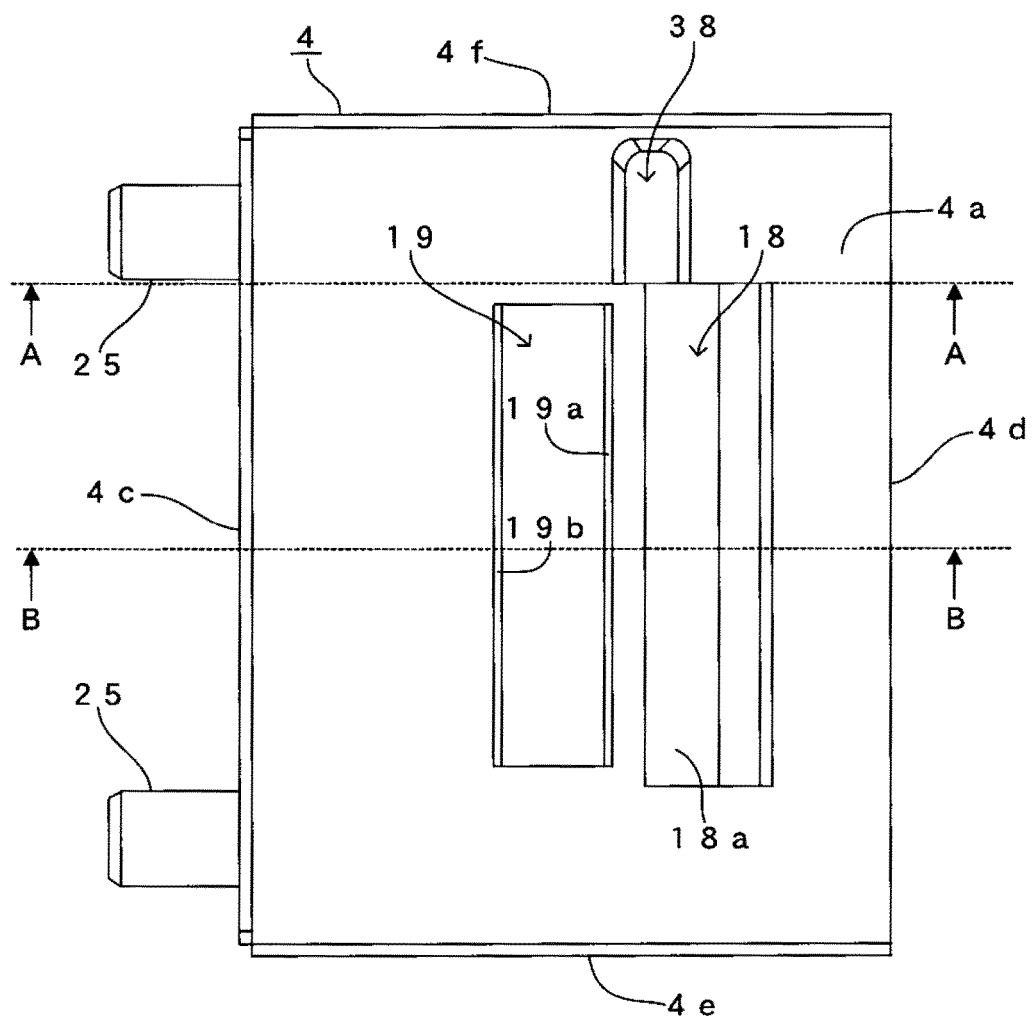
FIG. 4 is a planar view of a variation example according to the first embodiment.
Figure 5:
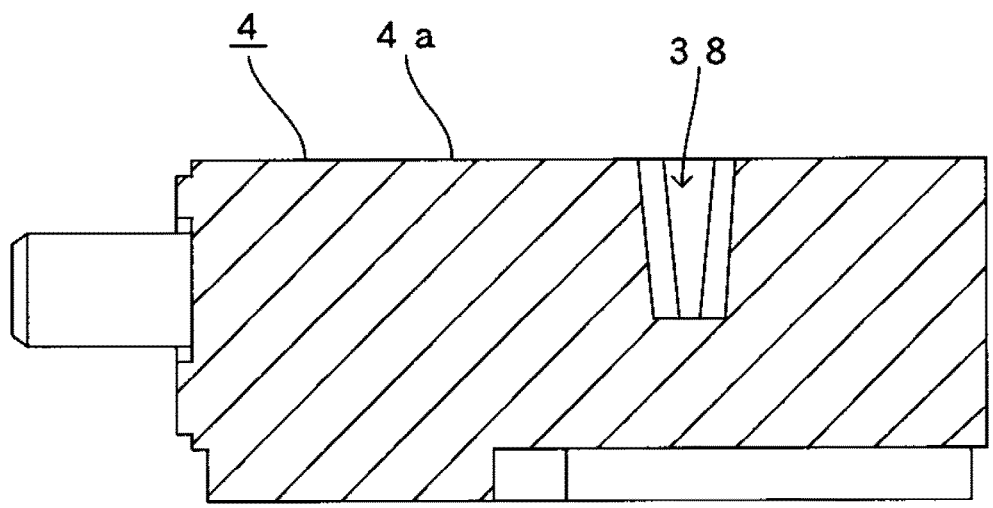
FIG. 5 is a cross-sectional view taken along A-A in FIG. 4.
Figure 6:
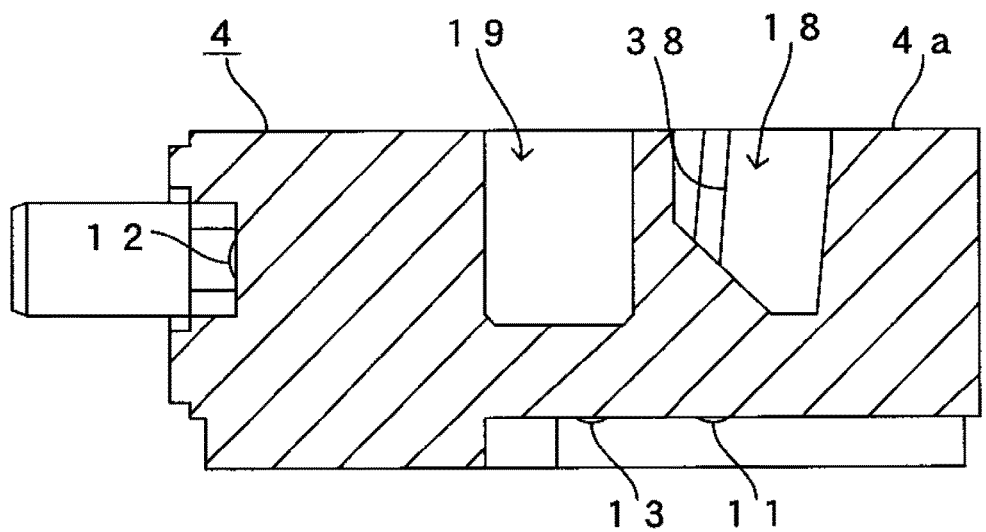
FIG. 6 is a cross-sectional view taken along B-B in FIG. 4.

Next, a variation example according to the present embodiment is shown in FIG. 4 to FIG. 6. FIG. 4 is a planar view of the lens array main body 4 of the lens array of the present variation example. FIG. 5 is a cross-sectional view taken along A-A in FIG. 4. FIG. 6 is a cross-sectional view taken along B-B in FIG. 4.

The lens array of the present variation example mainly differs from the configuration shown in FIG. 1 to FIG. 3 in that the third recessing section 38 is formed in a recessing manner such as to be connected to the back end portion of the first recessing section 18 rather than the second recessing section 19. Specifically, as shown in FIG. 4, the right half portion in FIG. 1 of the front end portion of the third recessing section 38 is connected to a portion on the left end portion side in the back end portion of the first recessing section 18.

In addition, in the present variation example, the back end portion of the first recessing section 18 is positioned further towards the back than the back end portion of the second recessing section 19.

In the lens array of the present variation example as well, in a manner similar to the configuration shown in FIG. 1 to FIG. 3, as a result of the three dimensional shape of the third recessing section 38, during molding of the lens array main body 4, the flow of molten resin material from the back end surface 4f side into the flow path corresponding with the area between the recessing sections 18 and 19 can be suppressed.

In addition, the shape of the third recessing section 38 does not have to become complex to prevent the third recessing section 38 from connecting with the second recessing section 19.

Figure 7:
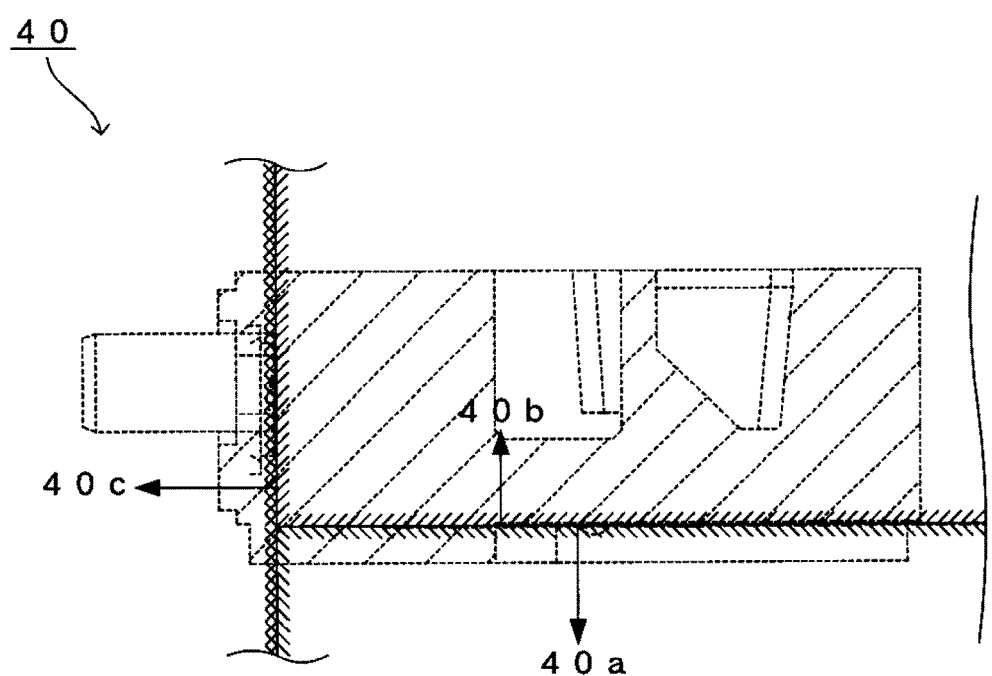
FIG. 7 is an overall configuration diagram of a mold for injection-molding the lens array main body in a method of manufacturing a lens array according to an embodiment.

The lens array main body 4 of the lens array according to the present embodiment can, for example, be manufactured using an injection-molding mold 40 such as that shown in FIG. 7. The mold 40 is configured by an upper mold 40a (movable type) in which the transfer surfaces of the first lens faces 11, the third lens faces 13, and the like are formed, a lower mold 40b (stationary type) in which the transfer surfaces of the recessing sections 18, 19, and 38, the front end surface 4e, the back end surface 4f, and the like are formed, and a slide mold 4c in which the transfer surfaces of the second lens faces 12 and the like are formed. The mold is designed such as to satisfy the optimal shape of the third recessing section 38 based on flow analysis of the molten resin material.

[First Example]

Figure 9:
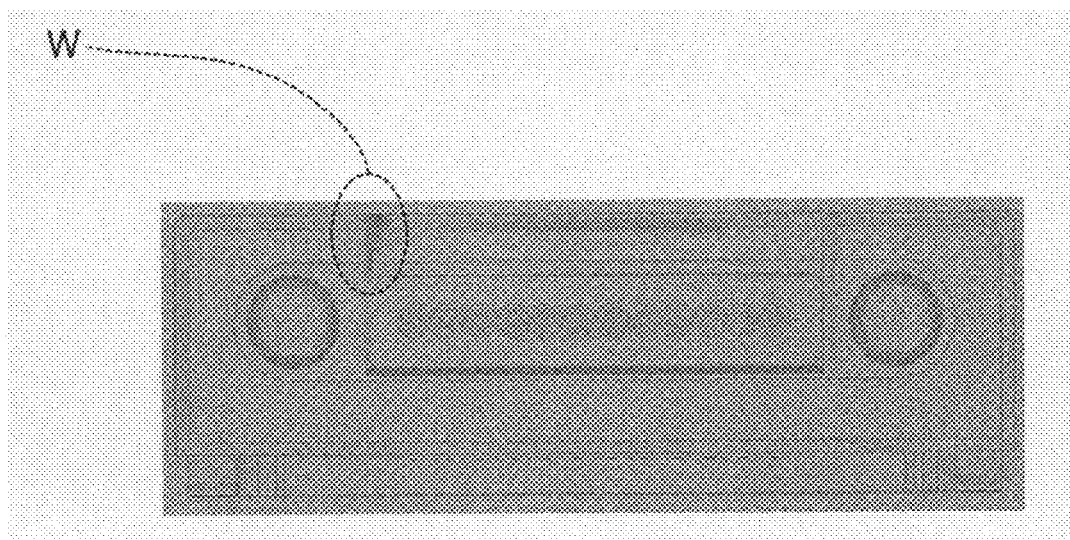
FIG. 9 is a cross-sectional view taken along A-A in FIG. 8.

Next, FIG. 8 and FIG. 9 (cross-sectional view taken along A-A in FIG. 8) show flow analysis results of the molten resin material in an instance in which the lens array main body 4 according to the present embodiment shown in FIG. 4 to FIG. 6 is molded using a mold, as an example according to the present embodiment. The conditions for flow analysis are similar to those of the instance in FIG. 30 and FIG. 31.

Figure 30:
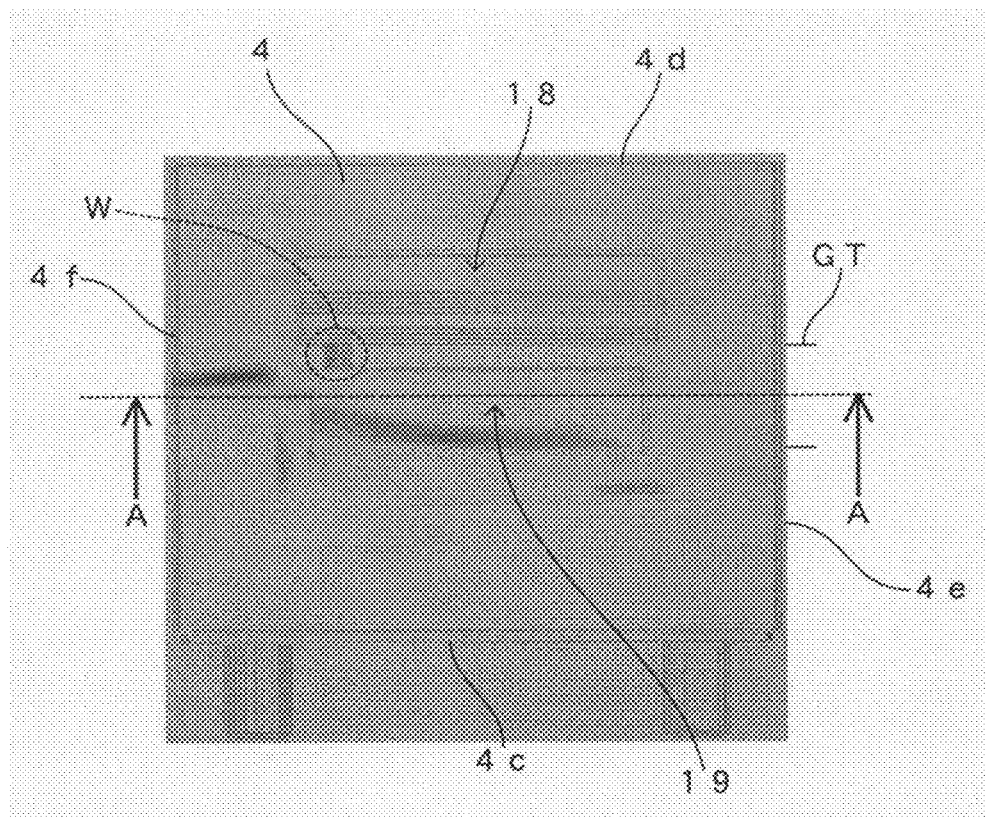
FIG. 30 is a planar view of flow analysis results of a molten resin material in an instance in which the lens array main body of the lens array that supports light-monitoring is molded using a mold.
Figure 31:
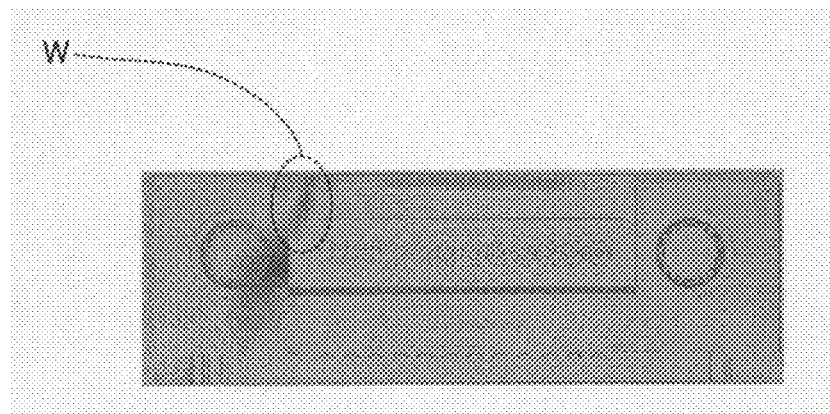
FIG. 31 is a cross-sectional view taken along A-A in FIG. 30.

As shown in FIG. 8 and FIG. 9, according to the present embodiment, compared to the instance in FIG. 30 and FIG. 31, it is clear that the weld between the recessing sections 18 and 19 is effectively reduced. This is because the molten resin material flowing through the flow path corresponding with the area between the first recessing section 18 and the right end surface 4d and the molten resin material flowing through the flow path corresponding with the area between the second recessing section 19 and the left end surface 4c after reaching the transfer surface of the back end surface 4f are suppressed from entering the flow path corresponding with the area between the recessing sections 18 and 19 such as to go around from the side of the transfer surface of the back end surface 4f, as a result of the three dimensional shape of the third recessing section 38.

(Second Embodiment)

Next, a lens array and a method of manufacturing the lens array according to a second embodiment of the present invention will be described with reference to FIG. 10 to FIG. 19.

The basic configuration of the lens array according to the present embodiment is similar to that of the lens array 31 supporting bidirectional communication shown in FIG. 26 to FIG. 29. Therefore, configurations other than those unique to the present embodiment will be described using the same reference numbers as those of the lens array 31.

Figure 10:
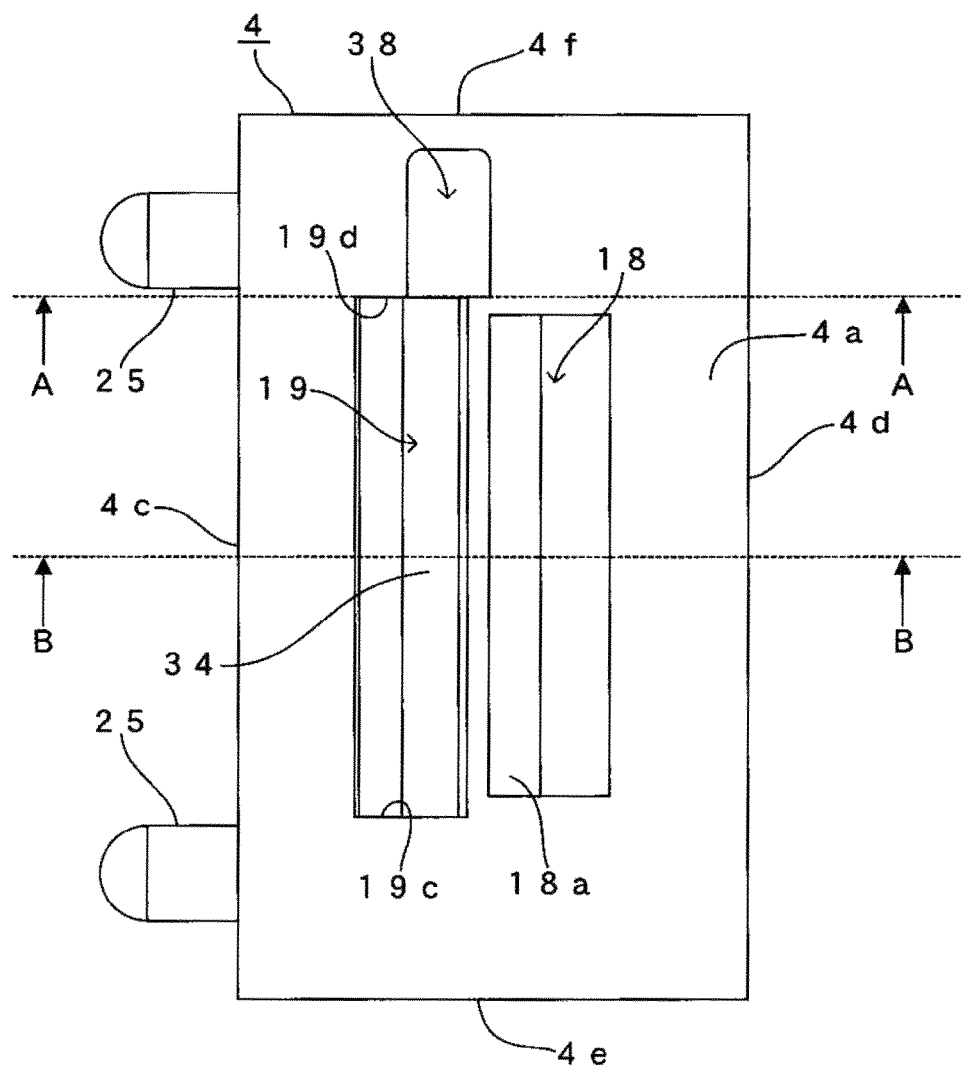
FIG. 10 is a planar view of a lens array main body of a lens array according to a second embodiment of the present invention.
Figure 11:
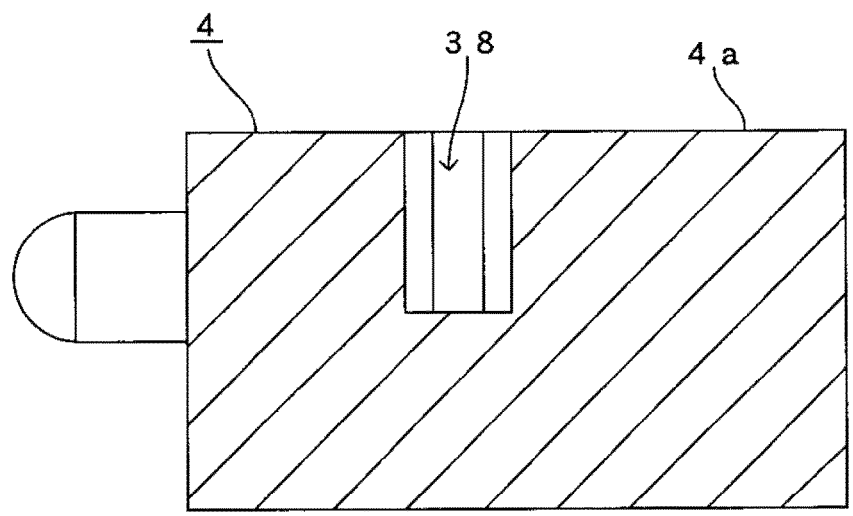
FIG. 11 is a cross-sectional view taken along A-A in FIG. 10.
Figure 12:
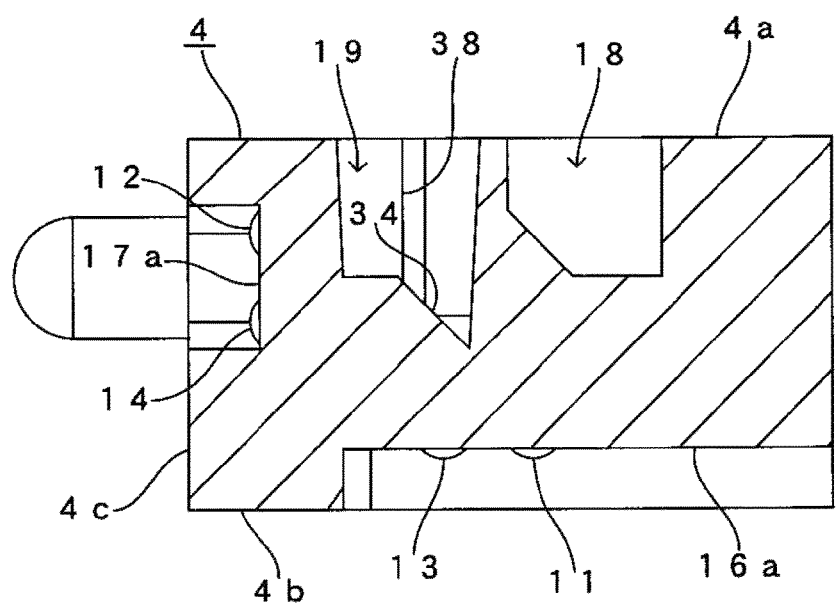
FIG. 12 is a cross-sectional view taken along B-B in FIG. 10.

FIG. 10 is a planar view of the lens array main body 4 of the lens array according to the present embodiment. FIG. 11 is a cross-sectional view taken along A-A in FIG. 10. FIG. 12 is a cross-sectional view taken along B-B in FIG. 10. FIG. 12 corresponds with the vertical cross-sectional view shown in FIG. 26. The left-side view of the lens array main body 4 is similar to that in FIG. 28. The bottom view is similar to that in FIG. 29.

The lens array according to the present embodiment is the lens array supporting bidirectional communication formed by injection molding using a mold, similar to the lens array 31 shown in FIG. 26 to FIG. 29. The lens array has a similar configuration as the lens array 31.

In other words, as shown in FIG. 12, unlike that according to the first embodiment, the plurality of fourth lens faces 14 are formed on the left end surface 4c (lens formation surface 17a) of the lens array main body 4 in an array along the array direction (the direction perpendicular to the paper on which FIG. 12 is printed in FIG. 12) of the first lens faces 11. In addition, according to the present embodiment, unlike that according to the first embodiment, the second recessing section 19 has the second total reflection surface 34.

In addition to the configuration such as this, further, according to the present embodiment, in a manner similar to that according to the first embodiment, the front end surface 4e of the lens array main body 4 is the surface on the gate GT side.

In addition, as shown in FIG. 10 to FIG. 12, the third recessing section 38 that is connected to the back end portion of the second recessing section 19 is formed in a recessing manner on the upper end surface 4a of the lens array main body 4, in a manner similar to the configuration shown in FIG. 1 to 3 according to the first embodiment.

According to the present embodiment as well, in a manner similar to that according to the first embodiment, as a result of the front end surface 4e being the surface on the gate GT side, the merging position of the molten resin material during molding of the lens array main body 4 can be placed away from the formation positions of the lens faces 11 to 14. Furthermore, as a result of the three dimensional shape of the third recessing section 38, during molding of the lens array main body 4, the flow of molten resin material from the back end surface 4f side into the flow path corresponding with the area between the recessing sections 18 and 19 can be suppressed. As a result, during molding of the bidirectional communication-supporting lens array main body 4 (lens array), occurrence of welds on the lens faces 11 to 14 and near the first optical path between the recessing sections 18 and 19 can be effectively suppressed.

(Variation Example)

Figure 13:
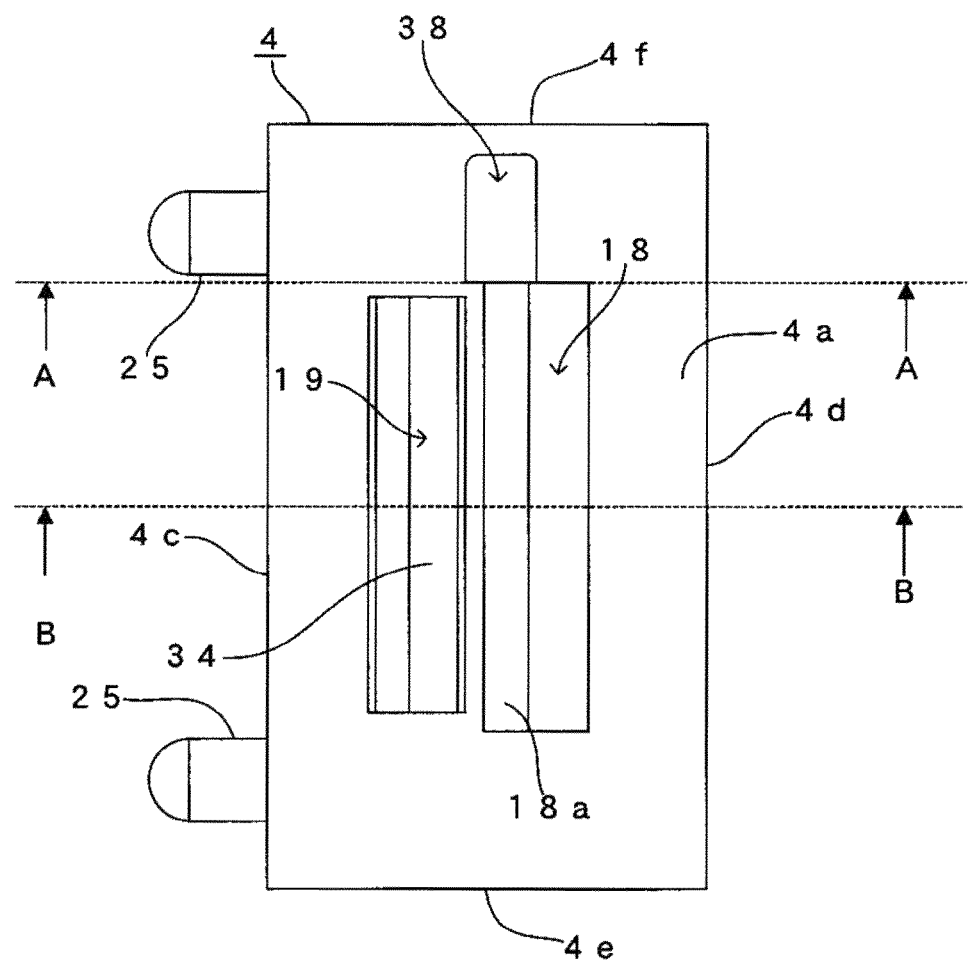
FIG. 13 is a planar view of a variation example according to the second embodiment.
Figure 14:
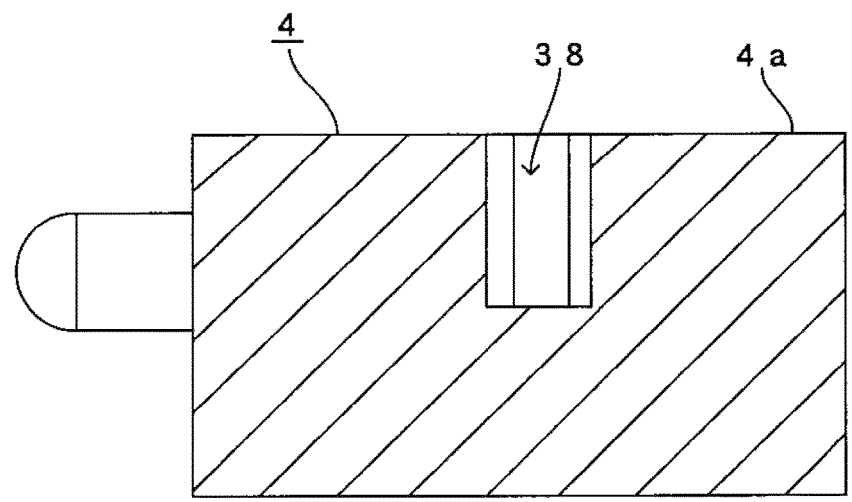
FIG. 14 is a cross-sectional view taken along A-A in FIG. 13.
Figure 15:
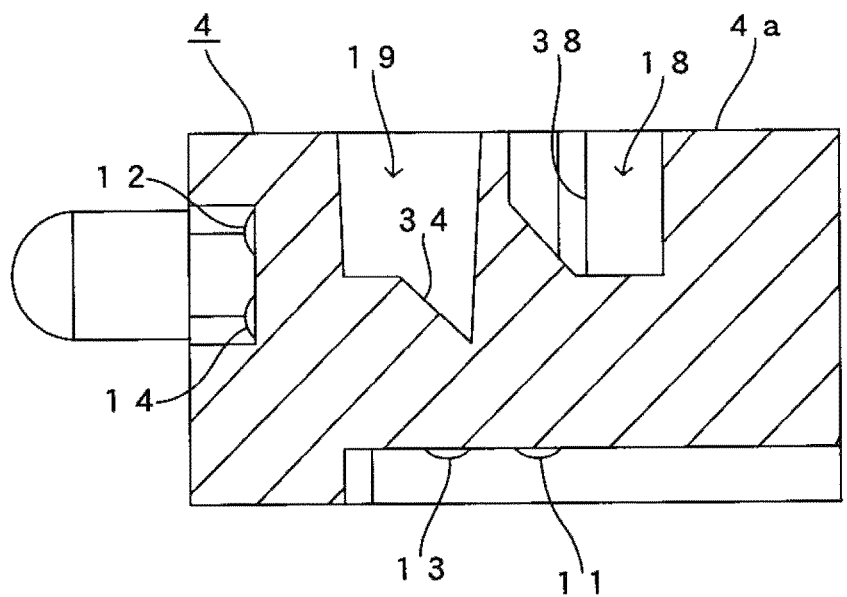
FIG. 15 is a cross-sectional view taken along B-B in FIG. 13.

Next, a variation example according to the present embodiment is shown in FIG. 13 to FIG. 15. FIG. 13 is a planar view of the lens array main body 4 of the lens array of the present variation example. FIG. 14 is a cross-sectional view taken along A-A in FIG. 13. FIG. 15 is a cross-sectional view taken along B-B in FIG. 13.

The lens array of the present variation example mainly differs from the configuration shown in FIG. 10 to FIG. 12 in that the third recessing section 38 is formed in a recessing manner such as to be connected to the back end portion of the first recessing section 18 rather than the second recessing section 19. The configuration of the third recessing section 38 of the present variation example is similar to that in the variation example according to the first embodiment.

In the lens array of the present variation example as well, in a manner similar to the configuration shown in FIG. 10 to FIG. 12, as a result of the three dimensional shape of the third recessing section 38, during molding of the lens array main body 4, the flow of molten resin material from the back end surface 4f side into the flow path corresponding with the area between the recessing sections 18 and 19 can be suppressed.

[Second Example]

Figure 16:
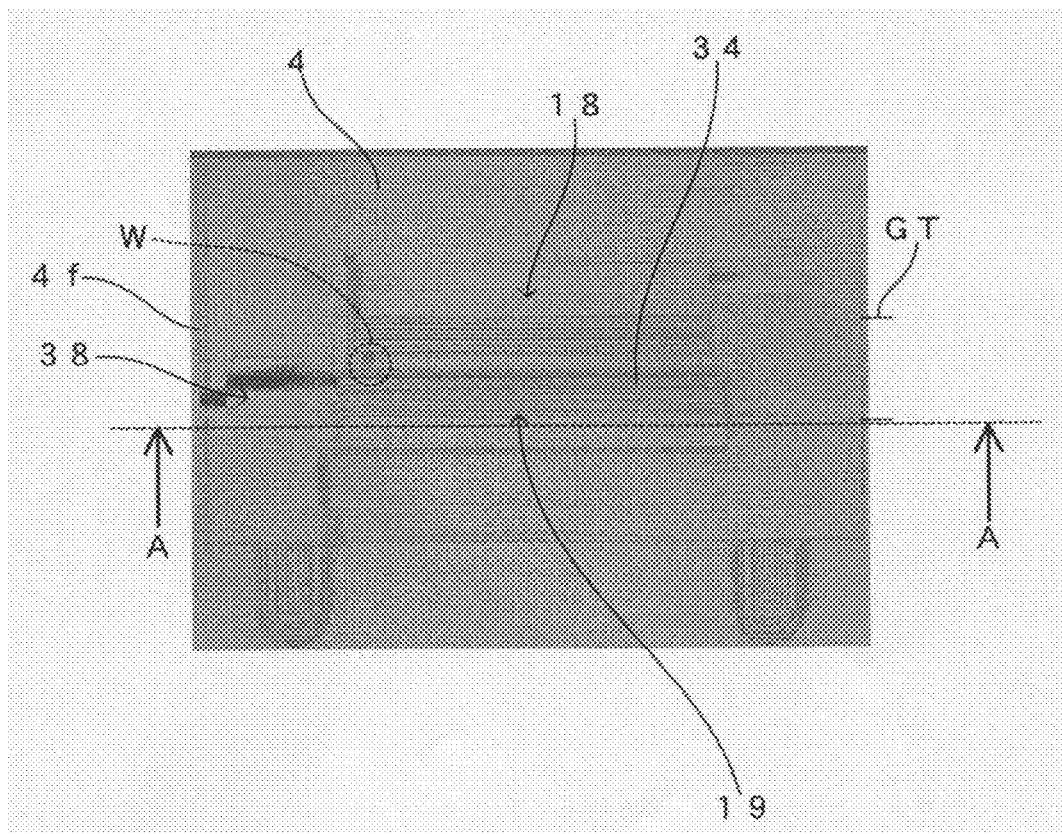
FIG. 16 is a planar view of flow analysis results of a molten resin material in an instance in which a lens array main body shown in FIG. 10 to FIG. 12 is molded using a mold, as an example according to the second embodiment.
Figure 17:
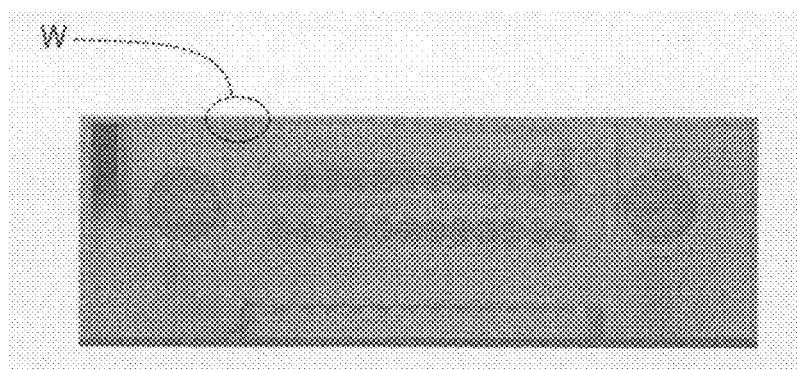
FIG. 17 is a cross-sectional view taken along A-A in FIG. 16.

Next, FIG. 16 and FIG. 17 (cross-sectional view taken along A-A in FIG. 16) show flow analysis results of the molten resin material in an instance in which the lens array main body 4 according to the present embodiment shown in FIG. 10 to FIG. 12 is molded using a mold, as an example according to the present embodiment. The conditions for flow analysis are similar to those of the instance in FIG. 30 and FIG. 31.

Figure 32:
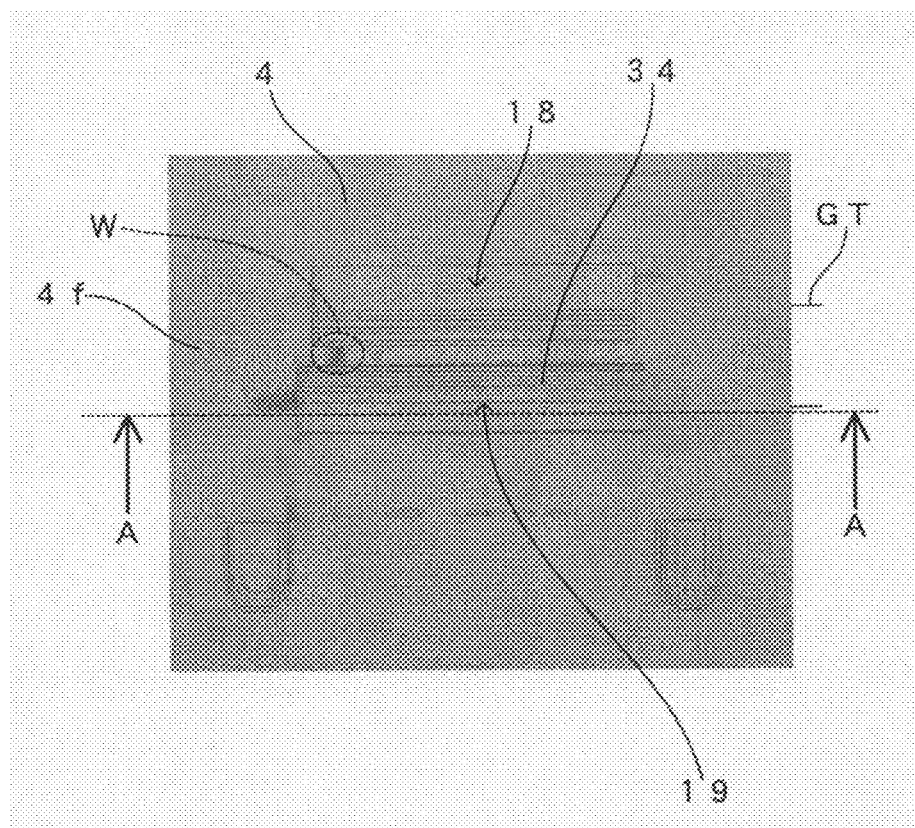
FIG. 32 is a planar view of flow analysis results of a molten resin material in an instance in which a lens array main body of a first lens array supporting bidirectional communication is molded using a mold.
Figure 33:
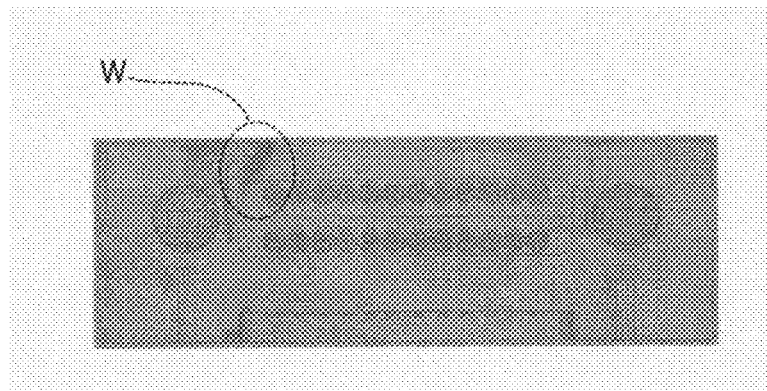
FIG. 33 is a cross-sectional view taken along A-A in FIG. 32.

As shown in FIG. 16 and FIG. 17, according to the present embodiment, it is clear that the weld between the recessing sections 18 and 19 is effectively reduced compared to that in the bidirectional communication-supporting lens array main body 4 having the same basic configuration without the third recessing section 38 (the instance in FIGS. 32 and 33).

[Third Example]

Figure 18:
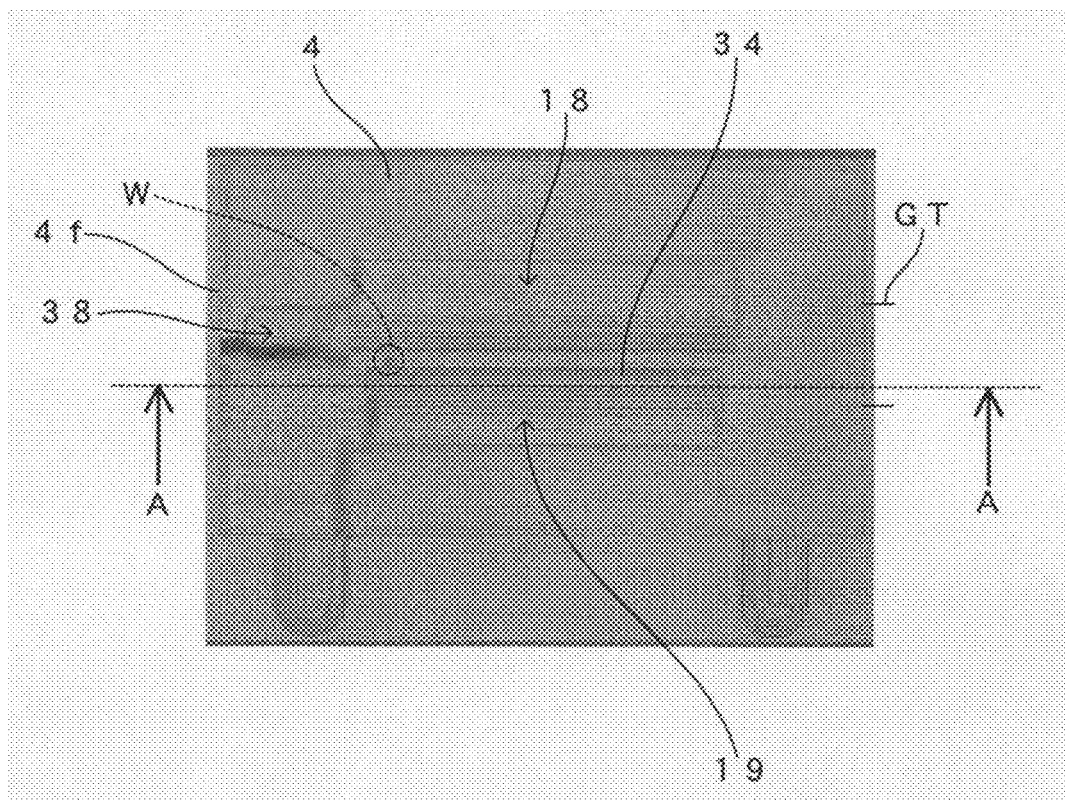
FIG. 18 is a planar view of flow analysis results of a molten resin material when a lens array main body shown in FIG. 13 to FIG. 15 is molded using a mold, as another example according to the second embodiment.
Figure 19:
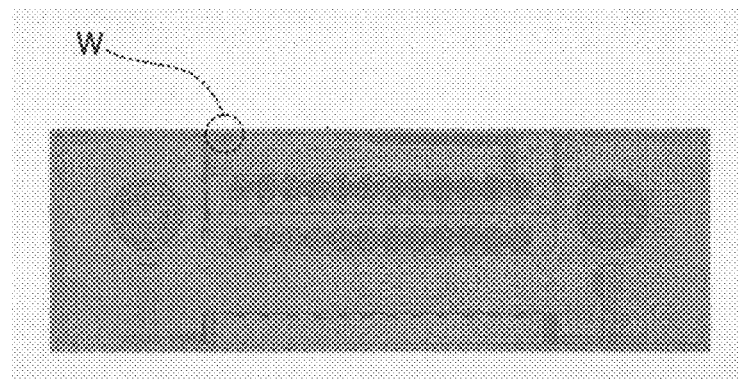
FIG. 19 is a cross-sectional view taken along A-A in FIG. 18.

Next, FIG. 18 and FIG. 19 (cross-sectional view taken along A-A in FIG. 18) show flow analysis results of the molten resin material in an instance in which the lens array main body 4 according to the present embodiment shown in FIG. 13 to FIG. 15 is molded using a mold, as an example according to the present embodiment. The conditions for flow analysis are similar to those of the instance in FIG. 30 and FIG. 31.

Figure 34:
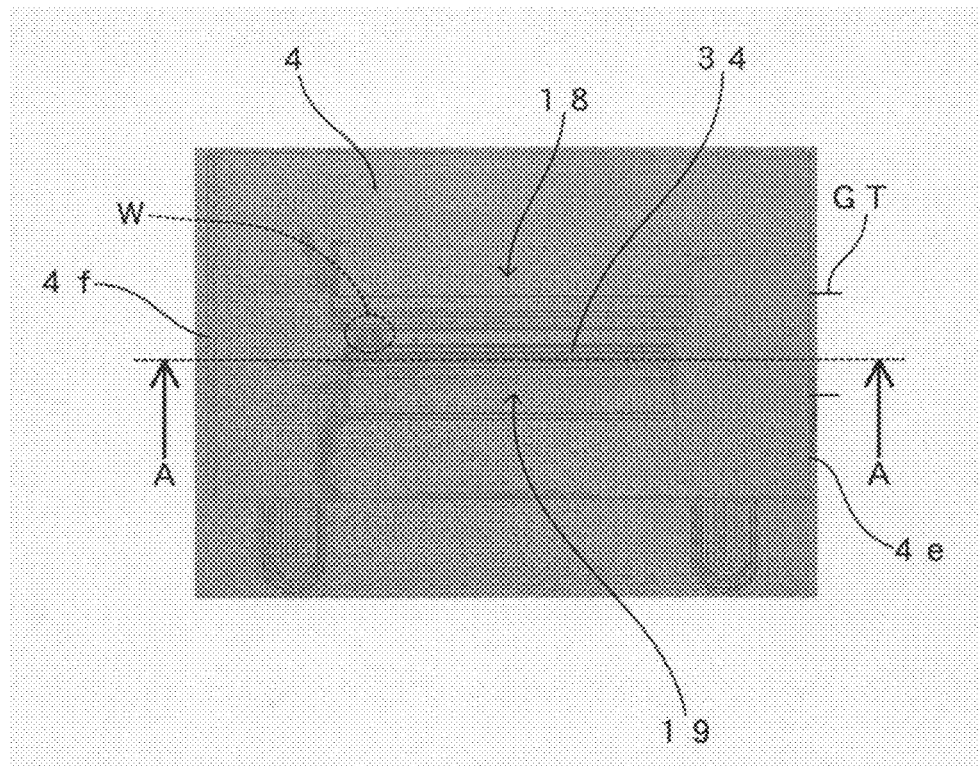
FIG. 34 is a planar view of flow analysis results of a molten resin material in an instance in which a lens array main body of a second lens array supporting bidirectional communication is molded using a mold.
Figure 35:
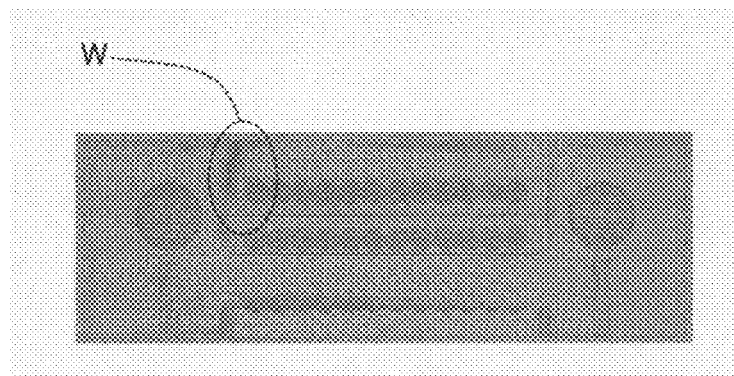
FIG. 35 is a cross-sectional view taken along A-A in FIG. 34.

As shown in FIG. 18 and FIG. 19, according to the present embodiment, it is clear that the weld between the recessing sections 18 and 19 is effectively reduced compared to that in the bidirectional communication-supporting lens array main body 4 having the same basic configuration without the third recessing section 38 (the instance in FIGS. 34 and 35).

The present invention is not limited to the above-described embodiments. Various modifications can be made to the extent that features of the present invention are not compromised.

The invention claimed is:

1. A method of manufacturing a lens array formed by resin molding using a mold, the lens array comprising:
    a plurality of first lens faces formed in an array in a predetermined array direction on a first surface of a lens array main body;
    a plurality of second lens faces formed in an array along the array direction on a second surface of the lens array main body that is adjacent to the first surface in a direction perpendicular to the array direction;
    at least a single third lens face formed in a position near the second surface in relation to the first lens faces on the first surface;
    a first recessing section formed in a recessing manner on a third surface of the lens array main body opposing the first surface, and including a total reflection surface for forming a first optical path passing through the first lens faces and the second lens faces; and
    a second recessing section formed in a recessing manner on the third surface in a position near the second surface side in relation to the first recessing section, such as to be positioned on the first optical path, for forming a second optical path passing through the third lens face, wherein
    a fourth surface of the lens array main body adjacent to the first surface and the second surface on one side in the array direction is a surface on a gate side of the mold, and
    a third recessing section for suppressing formation of weld near an optical path between the first recessing section and the second recessing section during molding of the lens array main body is formed on the third surface in a recessing manner such as to be connected to an end portion of the first recessing section on the other side in the array direction or an end portion of the second recessing section on the other side in the array direction, wherein:
    to manufacture the lens array, a three dimensional shape of the third recessing section is determined by flow analysis of a resin material, and the lens array is manufactured that includes the third recessing section having the determined three dimensional shape.

2. A method of manufacturing a lens array formed by resin molding using a mold, the lens array comprising:
    a plurality of first lens faces formed in an array in a predetermined array direction on a first surface of a lens array main body;
    a plurality of second lens faces formed in an array along the array direction on a second surface of the lens array main body that is adjacent to the first surface in a direction perpendicular to the array direction;
    at least a single third lens face formed in a position near the second surface in relation to the first lens faces on the first surface;

a first recessing section formed in a recessing manner on a third surface of the lens array main body opposing the first surface, and including a total reflection surface for forming a first optical path passing through the first lens faces and the second lens faces; and a second recessing section formed in a recessing manner on the third surface in a position near the second surface side in relation to the first recessing section, such as to be positioned on the first optical path, for forming a second optical path passing through the third lens face, wherein a fourth surface of the lens array main body adjacent to the first surface and the second surface on one side in the array direction is a surface on a gate side of the mold, a third recessing section for suppressing formation of weld near an optical path between the first recessing section and the second recessing section during molding of the lens array main body is formed on the third surface in a recessing manner such as to be connected to an end portion of the first recessing section on the other side in the array direction or an end portion of the second recessing section on the other side in the array direction, and the third recessing section is formed to be connected to the end portion of the first recessing section on the other side, and the end portion of the first recessing section on the other side is positioned further to the other side in the array direction than the end portion of the second recessing section on the other side, wherein:

to manufacture the lens array, a three dimensional shape of the third recessing section is determined by flow analysis of a resin material, and the lens array is manufactured that includes the third recessing section having the determined three dimensional shape.

3. A method of manufacturing a lens array formed by resin molding using a mold, the lens array comprising:

a plurality of first lens faces formed in an array in a predetermined array direction on a first surface of a lens array main body;

a plurality of second lens faces formed in an array along the array direction on a second surface of the lens array main body that is adjacent to the first surface in a direction perpendicular to the array direction;

at least a single third lens face formed in a position near the second surface in relation to the first lens faces on the first surface;

a first recessing section formed in a recessing manner on a third surface of the lens array main body opposing the first surface, and including a total reflection surface for forming a first optical path passing through the first lens faces and the second lens faces; and a second recessing section formed in a recessing manner on the third surface in a position near the second surface side in relation to the first recessing section, such as to be positioned on the first optical path, for forming a second optical path passing through the third lens face, wherein a fourth surface of the lens array main body adjacent to the first surface and the second surface on one side in the array direction is a surface on a gate side of the mold, a third recessing section for suppressing formation of weld near an optical path between the first recessing section and the second recessing section during molding of the lens array main body is formed on the third surface in a recessing manner such as to be connected to an end portion of the first recessing section on the other side in the array direction or an end portion of the second recessing section on the other side in the array direction, and the third recessing section is formed to be connected to the end portion of the second recessing section on the other side, and the end portion of the second recessing section on the other side is positioned further to the other side in the array direction than the end portion of the first recessing section on the other side, wherein:

to manufacture the lens array, a three dimensional shape of the third recessing section is determined by flow analysis of a resin material, and the lens array is manufactured that includes the third recessing section having the determined three dimensional shape.

* * * * *